(12) United States Patent
Makhervaks et al.

(10) Patent No.: US 9,723,009 B2
(45) Date of Patent: **\*Aug. 1, 2017**

(54) SYSTEM AND METHOD FOR PROVIDING FOR SECURE NETWORK COMMUNICATION IN A MULTI-TENANT ENVIRONMENT

(71) Applicant: Oracle International Corporation, Redwood Shores, CA (US)

(72) Inventors: Vadim Makhervaks, Bellevue, WA (US); Richard Mousseau, Stratham, NH (US); Bjørn Dag Johnsen, Oslo (NO); Sumanta Chatterjee, Fremont, CA (US); Avneesh Pant, Redwood City, CA (US); Jean De Lavarene, Levallois Perret (FR); Kant C. Patel, Fremont, CA (US); Bhaskar Mathur, Bangalore (IN); Feroz Alam Khan, Bangalore (IN); Sudeep Vatsanath Reguna, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/848,111

(22) Filed: Sep. 8, 2015

(65) Prior Publication Data
US 2016/0072817 A1 Mar. 10, 2016

Related U.S. Application Data

(60) Provisional application No. 62/048,096, filed on Sep. 9, 2014.

(51) Int. Cl.
*H04L 29/06* (2006.01)

(52) U.S. Cl.
CPC ........ *H04L 63/101* (2013.01); *H04L 63/0236* (2013.01); *H04L 63/0254* (2013.01); *H04L 63/1458* (2013.01); *H04L 63/20* (2013.01)

(58) Field of Classification Search
CPC .............. H04L 63/101; H04L 63/1458; H04L 63/0236; H04L 63/20; H04L 63/0254
See application file for complete search history.

(56) References Cited

U.S. PATENT DOCUMENTS

| 4,304,001 | A | 12/1981 | Cope |
| 7,398,394 | B1 * | 7/2008 | Johnsen ................. H04L 63/08 713/150 |

(Continued)

FOREIGN PATENT DOCUMENTS

| CN | 101809943 | 8/2010 |
| CN | 102209024 | 10/2011 |
| CN | 102334112 | 1/2012 |

OTHER PUBLICATIONS

European Patent Office, International Searching Authority, International Search Report and Written Opinion dated Nov. 9, 2015 for International Application No. PCT/US2015/049193, 11 pages.

(Continued)

*Primary Examiner* — Joseph P Hirl
*Assistant Examiner* — Stephen Gundry
(74) *Attorney, Agent, or Firm* — Tucker Ellis LLP

(57) ABSTRACT

A security solution provides secure communication in a multi-tenant environment which includes a connection-based fabric, storage cells holding data associated with different tenants, database servers which provide a plurality of database services using said data, application servers hosting database service consumers. The fabric is configured into partitions isolating the storage cells from the database service consumers. The application servers securely associate unique database service consumer identities with each (Continued)

database service consumer and all communications with the database servers. The database servers reject all communications from the application servers which do not include an identity and use an access control list to control access from the database service consumers to the database services using address resolution access control, connection establishment access control, and data exchange access control based on said access control list. DoS attack prevention can also be performed based on consumer identities included in packets.

20 Claims, 7 Drawing Sheets

(56) References Cited

U.S. PATENT DOCUMENTS

| | | | |
|---|---|---|---|
| 7,962,564 B2 | 6/2011 | Errickson | |
| 7,970,913 B2 | 6/2011 | Machulsky | |
| 7,983,265 B1* | 7/2011 | Dropps | H04L 12/66 370/392 |
| 7,996,583 B2 | 8/2011 | Wilkinson | |
| 8,266,275 B2 | 9/2012 | Xu | |
| 8,331,381 B2* | 12/2012 | Brown | H04L 12/66 370/401 |
| 8,335,909 B2 | 12/2012 | Ballew | |
| 8,589,921 B2 | 11/2013 | Heim | |
| 8,739,273 B2* | 5/2014 | Johnsen | H04L 41/0803 726/13 |
| 8,972,988 B2 | 3/2015 | Ikegami | |
| 9,104,645 B2 | 8/2015 | Dawkins | |
| 9,253,014 B2 | 2/2016 | Miki | |
| 9,304,798 B2* | 4/2016 | Mudigonda | H04L 67/1095 |
| 9,330,102 B2* | 5/2016 | McGrath | G06F 17/30076 |
| 9,397,946 B1* | 7/2016 | Yadav | H04L 41/0806 |
| 2003/0208531 A1 | 11/2003 | Matters | |
| 2004/0215848 A1 | 10/2004 | Craddock | |
| 2005/0120160 A1 | 6/2005 | Plouffe | |
| 2005/0286511 A1* | 12/2005 | Johnsen | H04L 63/126 370/389 |
| 2006/0117103 A1 | 6/2006 | Brey et al. | |
| 2006/0155880 A1 | 7/2006 | Elnozahy | |
| 2007/0110245 A1 | 5/2007 | Sood et al. | |
| 2007/0195774 A1 | 8/2007 | Sherman | |
| 2008/0189432 A1 | 8/2008 | Abali | |
| 2008/0192750 A1 | 8/2008 | Ko et al. | |
| 2008/0282335 A1 | 11/2008 | Abzarian | |
| 2009/0025007 A1 | 1/2009 | Hara | |
| 2009/0077268 A1* | 3/2009 | Craddock | H04L 12/1886 709/250 |
| 2009/0222640 A1 | 9/2009 | Bauman | |
| 2009/0260083 A1* | 10/2009 | Szeto | H04L 63/0263 726/22 |
| 2010/0037309 A1* | 2/2010 | Dargis | H04L 63/0272 726/13 |
| 2010/0125855 A1* | 5/2010 | Ferwerda | G06F 9/5027 719/317 |
| 2010/0284403 A1 | 11/2010 | Scudder | |
| 2010/0306381 A1 | 12/2010 | Lublin | |
| 2011/0119427 A1 | 5/2011 | Dow | |
| 2011/0131568 A1 | 6/2011 | Heim | |
| 2011/0276661 A1 | 11/2011 | Gujarathi | |
| 2011/0283017 A1 | 11/2011 | Alkhatib | |
| 2011/0299537 A1 | 12/2011 | Saraiya | |
| 2012/0042034 A1 | 2/2012 | Goggin | |
| 2012/0173757 A1 | 7/2012 | Sanden | |
| 2012/0233282 A1 | 9/2012 | Voccio | |
| 2012/0265956 A1 | 10/2012 | Nakamichi | |
| 2012/0284786 A1* | 11/2012 | Somani | H04L 63/0815 726/7 |
| 2012/0297379 A1 | 11/2012 | Anderson | |
| 2012/0311333 A1* | 12/2012 | Johnsen | H04L 9/3234 713/168 |
| 2012/0311670 A1* | 12/2012 | Johnsen | H04L 9/3234 726/3 |
| 2012/0311682 A1* | 12/2012 | Johnsen | H04L 41/32 726/5 |
| 2013/0019277 A1* | 1/2013 | Chang | H04L 63/0218 726/1 |
| 2013/0019302 A1* | 1/2013 | Johnsen | H04L 41/0803 726/13 |
| 2013/0055240 A1 | 2/2013 | Gondi | |
| 2013/0091534 A1* | 4/2013 | Gilde | H04L 63/0227 726/1 |
| 2013/0205376 A1* | 8/2013 | Narasimha | H04L 9/3247 726/6 |
| 2013/0223447 A1 | 8/2013 | Kahng | |
| 2013/0223449 A1 | 8/2013 | Koganti | |
| 2013/0227561 A1* | 8/2013 | Walsh | G06F 9/455 718/1 |
| 2013/0259033 A1* | 10/2013 | Hefty | H04L 45/00 370/355 |
| 2013/0298183 A1* | 11/2013 | McGrath | G06F 9/455 726/1 |
| 2013/0315102 A1 | 11/2013 | Kahng | |
| 2013/0315237 A1 | 11/2013 | Kagan | |
| 2013/0318341 A1* | 11/2013 | Bagepalli | H04L 63/166 713/151 |
| 2014/0019571 A1 | 1/2014 | Cardona | |
| 2014/0056298 A1 | 2/2014 | Vobbilisetty | |
| 2014/0068258 A1* | 3/2014 | Chao | G06F 11/1469 713/167 |
| 2014/0177639 A1 | 6/2014 | Vershkov | |
| 2014/0188996 A1 | 7/2014 | Lie | |
| 2014/0317716 A1* | 10/2014 | Chao | H04L 63/0815 726/9 |
| 2014/0351920 A1* | 11/2014 | Madani | H04L 12/4633 726/14 |
| 2015/0012962 A1* | 1/2015 | Walsh | H04L 63/105 726/1 |
| 2015/0026332 A1* | 1/2015 | Madani | G06F 8/60 709/224 |
| 2015/0066759 A1* | 3/2015 | Madani | H04L 41/0893 705/41 |
| 2015/0067020 A1* | 3/2015 | Makhervaks | H03M 13/09 709/202 |
| 2015/0067191 A1* | 3/2015 | Makhervaks | H03M 13/09 709/244 |
| 2015/0067789 A1* | 3/2015 | Madani | H04L 63/10 726/4 |
| 2015/0067809 A1* | 3/2015 | Madani | H04L 63/0815 726/8 |
| 2015/0195303 A1* | 7/2015 | Holden | H04L 63/1458 709/229 |
| 2015/0244817 A1* | 8/2015 | Johnsen | H04L 67/16 709/223 |
| 2015/0363219 A1* | 12/2015 | Kasturi | H04L 41/5058 718/1 |
| 2015/0381576 A1* | 12/2015 | Bosko | H04L 63/0428 713/168 |
| 2015/0381590 A1* | 12/2015 | Bosko | H04L 63/0428 713/171 |
| 2016/0036920 A1* | 2/2016 | Sama | H04L 63/10 709/203 |
| 2016/0036921 A1* | 2/2016 | Sama | H04L 63/10 726/4 |

OTHER PUBLICATIONS

United States Patent and Trademark Office, Notice of Allowance and Fee(s) Due Dated April 28, 2016 for U.S. Appl. No. 13/838,275, 20 Pages.

United States Patent and Trademark Office, Notice of Allowance and Fee(s) Due Dated May 17, 2016 for U.S. Appl. No. 13/838,121, 17 Pages.

United States Patent and Trademark Office, Office Action Dated May 16, 2016 for U.S. Appl. No. 14/467,868, 10 Pages.

(56) References Cited

OTHER PUBLICATIONS

State Intellectual Property Office of the People's Republic of China, Office Action Dated Oct. 27, 2016 for Chinese Patent Applciation No. 201380008050.8, 10 Pages.
State Intellectual Property Office of the People's Republic of China, Office Action Dated Oct. 24, 2016 for Chinese Patent Applciation No. 201380008060.1, 10 Pages.
State Intellectual Property Office of the People's Republic of China, Office Action for Chinese Patent Application No. 201380008048.0 Dated Jan. 4, 2017, 10 Pages.
U.S. Office Action Dated Jun. 15, 2017 for U.S. Appl. No. 13/488,113, 22 pages.
Shanley, Tom "Infiniband Network Architecture" Copyright 2002 by Mindshare, Inc., ISBN: 0-321-11765-4, pp. 117-123 and 629-633.

* cited by examiner

SYSTEM AND METHOD FOR PROVIDING FOR SECURE NETWORK COMMUNICATION IN A MULTI-TENANT ENVIRONMENT

CLAIM OF PRIORITY

This application claims priority to U.S. Provisional Patent Application No. 62/048,096, entitled "SYSTEM AND METHOD FOR PROVIDING SECURE COMMUNICATION IN A MULTI-TENANT ENVIRONMENT" filed Sep. 9, 2014, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to providing secure communication in a network environment.

CROSS REFERENCE TO RELATED APPLICATIONS

This application is related to the following patent application, which is hereby incorporated by reference in its entirety: U.S. Patent Application titled "SYSTEM AND METHOD FOR PROVIDING AN INTEGRATED FIREWALL FOR SECURE NETWORK COMMUNICATION IN A MULTI-TENANT ENVIRONMENT", application Ser. No. 14/848,109, filed Sep. 8, 2015.

BACKGROUND

The interconnection network plays a beneficial role in the next generation of super computers, clusters, and data centers. As larger cloud computing architectures are introduced, the performance and administrative bottlenecks associated with the traditional network and storage have become a significant problem. A next generation data center can include a middleware machine system having a plurality of compute nodes for hosting applications. One example of such a middleware machine system is the Oracle® Exalogic computer appliance. A next generation data center can also include a database server system. One example of a database server system is the Oracle® Exadata Database Machine. The middleware machine system works in cooperation with the database server system. Data stored in the database server system is used and retrieved for computer operations in the middleware machine system, data generated or modified in the middleware machine system is stored in the database server system. Accordingly, it is important that the connection between the middleware machine system and the database server system be reliable, high speed, low latency and high bandwidth with low protocol overhead. For example, the InfiniBand (IB) technology has seen increased deployment as the foundation for a cloud computing fabric. InfiniBand is a connection-based communication protocol which uses a switched fabric topology which can support, among other things, remote direct memory access (RDMA) operations between the middleware machine system and database server system.

However, data centers are often shared by multiple tenants. The multiple tenants may be for example different corporate entities in cloud computing environments. Even where a data center is dedicated to a single corporate entity there may be multiple tenants in the form of different departments such as finance, human resources, engineering and the like which own data which must be kept private from other departments. It is important or necessary in multi-tenant environments that data be secured and accessible to authorized tenants and associated users and not accessible to unauthorized tenants and associated users. Likewise applications in the middleware machine system are associated with particular tenants and thus data in the database server system should be accessible to certain applications and not to others.

A conventional way to protect data from unauthorized access is to use a firewall appliance. A firewall appliance such as an Ethernet firewall appliance can be placed between a middleware machine system and a database server system sitting in the shared Ethernet medium. The firewall appliance controls access to database services making a port available for such service to authorized tenants and their associated applications and not to unauthorized tenants and their associated applications. However, use of such a firewall appliance necessarily prevents direct connection between the middleware machine system and the database server system and acts as a bottleneck on the indirect connection. No InfiniBand firewall appliance is currently available. Thus, if a firewall is required/specified, a conventional Ethernet firewall appliance (or the like) should be used. However, the use of a conventional Ethernet firewall appliance introduces additional networking overhead, and creates a bottleneck which limits the scalability of the system. The use of a conventional Ethernet firewall appliance precludes the use of a high speed connection-based switched fabric such as InfiniBand as well as the optimizations that such a connection-based switched fabric provides to operations performed between the middleware machine system and the database server system.

Prior systems and methods for providing and controlling data flow in an engineered system for middleware and application execution system using an intermediate node to provide security are described in U.S. Patent Application titled "SYSTEM AND METHOD FOR PROVIDING A DATA SERVICE IN AN ENGINEERED SYSTEM FOR MIDDLEWARE AND APPLICATION EXECUTION", application Ser. No. 14/467,859, filed Aug. 25, 2014; U.S. Patent Application titled "SYSTEM AND METHOD FOR CONTROLLING A DATA FLOW IN AN ENGINEERED SYSTEM FOR MIDDLEWARE AND APPLICATION EXECUTION", application Ser. No. 14/467,860, filed Aug. 25, 2014; U.S. Patent Application titled "SYSTEM AND METHOD FOR SUPPORTING DATA SERVICE ADDRESSING IN AN ENGINEERED SYSTEM FOR MIDDLEWARE AND APPLICATION EXECUTION", application Ser. No. 14/467,868, filed Aug. 25, 2014; and U.S. Patent Application titled "SYSTEM AND METHOD FOR SUPPORTING HOST CHANNEL ADAPTER (HCA) FILTERING IN AN ENGINEERED SYSTEM FOR MIDDLEWARE AND APPLICATION EXECUTION", application Ser. No. 14/467,896, filed Aug. 25, 2014, which applications are incorporated herein by reference. However, use of an intermediate node necessarily increases latency and overhead to the communication channel. These applications describe a firewall appliance which has general applicability. However, the solution requires extra networking overhead, impacting latency and scalability issues, because the intermediate node receives and processes each packet traveling between two end points. Additionally, in light of the processing required for each packet, the system makes a trade-off between how much deep packet processing is performed relative to the overhead, latency, and scalability impacts.

In order to provide solution similar to one described in this invention disclosure using standard firewall appliance, one would need to track state of each connection and association of this connection with specific application layer construct, like for example database service, as we described in this invention disclosure.

It would therefore be desirable to overcome the disadvantages presented by the conventional use of an intermediary firewall appliance and/or intermediary node while providing a security solution that ensures the security of data in a multitenant environment.

SUMMARY

Described herein are systems and methods that overcome the disadvantages presented by the conventional use of intermediary firewall appliance while providing a security solution that ensures the security of data in a multitenant environment. The security solution described herein avoids the use of an intermediary firewall appliance necessarily and allows bottleneck-free direct connection between the middleware machine system and the database server system. The security solution enables the use of a high speed connection-based switched fabric such as InfiniBand linking a middleware machine system and a database server system as well as optimizations that such a connection-based fabric can provide to operations performed between the middleware machine system and the database server system. Nodes in the middleware machine system and nodes in the database server system can be directly connected through one or more switches in the switched fabric without passing through any intermediate firewall appliance or computing node. The security solution operates in a manner which allows the system to take advantage of the full range of optimizations enabled by such direct connection including those provided by SR-IOV technology.

In some embodiments, the present disclosure describes an integrated firewall which provides security in a multi-tenant environment having a connection-based switched fabric directly connecting database servers which provide a plurality of database services with application servers hosting database service consumers each having a different database service consumer identity. The firewall functionality integrated into each database server provides access control by discarding communication packets which do not include a database service consumer identity and using the database service consumer identity in combination with an access control list to control access from the database service consumers to the database services. The access control includes address resolution access control, connection establishment access control, and data exchange access control based on said access control list. The integrated firewall enables direct connection of database servers and application servers via an InfiniBand network providing without requiring a separate intermediary firewall appliance or security node. The integrated firewall enables the system to take advantage of SR-IOV technology which provides direct networking hardware access from the consumers to the database services (when authorized).

In some embodiments, the present disclosure describes a complete security solution which provides secure communication in a multi-tenant environment which includes a connection-based fabric, storage cells holding data associated with different tenants, database servers which provide a plurality of database services using said data, application servers hosting database service consumers. The fabric is configured into multiple partitions isolating the storage cells from the database service consumers. Unique database service consumer identities are securely associated with each database service consumer. The security solution is configured such that the consumer identifiers are included in all communications between the database service consumers and the database servers. The database servers reject all communications from the database service consumers which do not include an identity. The database servers use an access control list in combination with the identities provided in communication packets to control access from the database service consumers to the database services using one or more of address resolution access control, connection establishment access control, and data exchange access control. Denial of service (DoS) attack prevention can also be performed based on consumer identities included in packets. The security solution enables direct connection of database servers and application servers via an InfiniBand network providing firewall functionality without requiring a separate intermediary firewall appliance or security node.

In some embodiments, the present disclosure describes systems and methods that can provide secure communication in a network environment. The network environment, such as a multi-tenant environment over a network, can include one or more service provider nodes, one or more service consumer nodes, and one or more storage cells. Said one or more service provider nodes can ensure secure communication between said one or more service provider nodes and said one or more service consumer nodes. Furthermore, the network environment can isolate one or more storage cells associated with said one or more service provider nodes from said one or more service consumer nodes. Additionally, the network environment can provide secure access, to one or more service provider instances running on said one or more service provider nodes, for one or more virtual machines (VMs) on said one or more service consumer nodes.

In some embodiments, the present disclosure describes, a method for providing secure communication in a network environment, comprising: ensuring, via one or more service provider nodes in the network environment, secure communication between said one or more service provider nodes and one or more service consumer nodes; isolating one or more storage cells associated with said one or more service provider nodes from said one or more service consumer nodes; and providing secure access to one or more service provider instances running on said one or more service provider nodes, for one or more virtual machines (VMs) on said one or more service consumer nodes.

These and other objects and advantages of the present invention will become apparent to those skilled in the art from the following description of the various embodiments, when read in light of the accompanying drawings.

BRIEF DESCRIPTION OF THE FIGURES

Various embodiments of the present invention are described in detail below based on the following figures.

DETAILED DESCRIPTION

Figure 1:
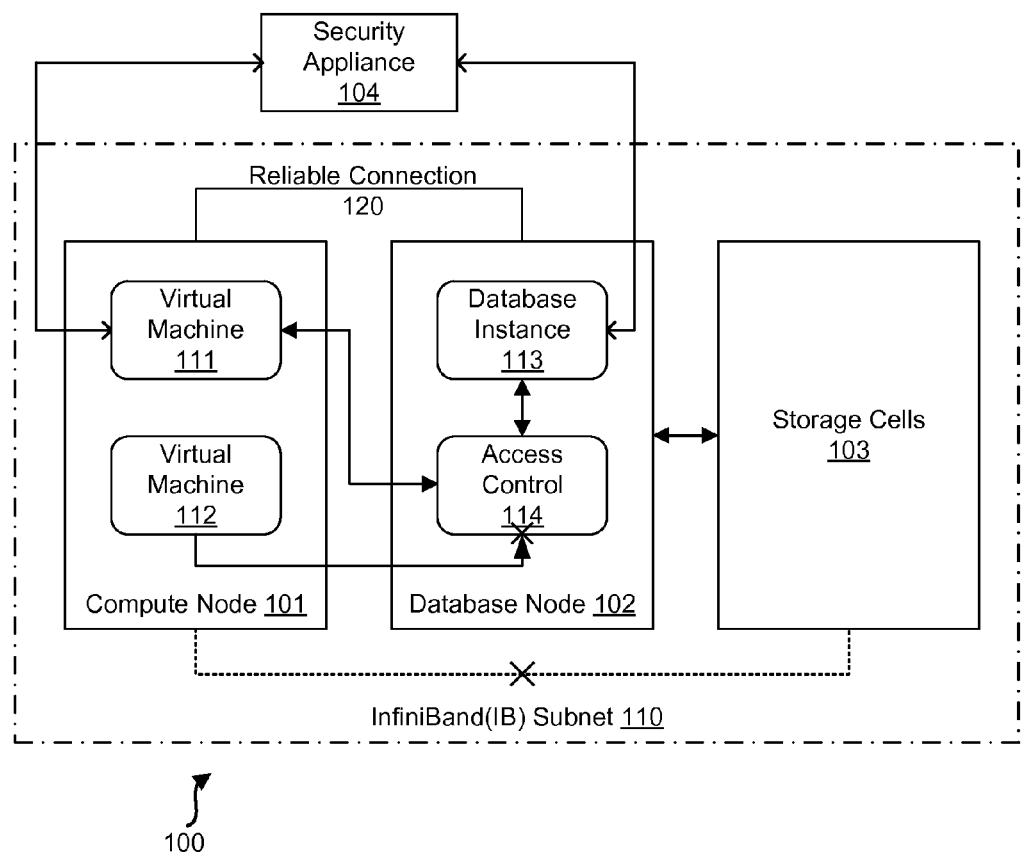
FIG. 1 shows an illustration of providing secure communication in a network environment, in accordance with an embodiment of the invention.

Described herein are systems and methods that can provide secure communication in a network environment. The network environment, such as a multi-tenant environment over a network, can include one or more service provider nodes, one or more service consumer nodes, and one or more storage cells. Said one or more service provider nodes can ensure secure communication between said one or more service provider nodes and said one or more service consumer nodes. Furthermore, the network environment can isolate one or more storage cells associated with said one or more service provider nodes from said one or more service consumer nodes. Additionally, the network environment can provide secure access, to one or more service provider instances running on said one or more service provider nodes, for one or more virtual machines (VMs) on said one or more service consumer nodes.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

In the following description, some embodiments describe a system having an Oracle® Exalogic middleware machine connected by an InfiniBand fabric to an Oracle® Exadata database server system is described. However, a person having ordinary skill in the art will understand that the present invention can be applied to many high performance computing environments without departing from the scope of the invention. Moreover, although numerous specific details of an Oracle® Exalogic middleware machine connected by an InfiniBand fabric to an Oracle® Exadata database server system are described to provide a thorough description of the invention, it will be apparent to those skilled in the art that the invention may be practiced without these specific details. Thus, a particular implementation of a multi-tenant computing environment embodying the present invention can, in some embodiments, exclude certain features, and/or include different, or modified features than those of the middleware machine, database server system and InfiniBand fabric described below, without departing from the scope of the invention.

FIG. 1 shows an overview of a system and method for providing secure communication in a network environment, in accordance with an embodiment of the invention. As shown in FIG. 1, a multi-tenant environment 100 can be based on an InfiniBand (IB) subnet 110. The IB subnet 110 includes one or more service providers (e.g. a database node 102), one or more service consumers (e.g. a virtual machine on compute node 101), and one or more storage cells 103. A typical system will comprise a large number of similar database nodes 102, compute nodes 101 and storage cells 103 connected by InfiniBand subnet 101.

As shown in FIG. 1, the multi-tenant environment 100 can rely on the database node 102 for performing firewall functions and for providing secure communication between the virtual machines 111 and 112 on the compute node 101 and the database instance 113 on database node 102. The database node 102, which is considered as a trusted security domain, tends to be securer than the virtual machines on compute node 101. Additionally, the multi-tenant environment 100 can isolate the storage cells 103 from the virtual machines on compute node 101, i.e. the storage cells 103 may only be accessible by the database nodes 102 and is not be accessible by the virtual machines on compute node 101.

In accordance with an embodiment of the invention, the IB subnet 110, which supports the multi-tenant environment 100, can be configured using different partitions. For example, the storage cells 103 may not be visible to the virtual machines on compute node 101, since the access to the storage cells 103 can be isolated via using a dedicated IB Partition. Additionally, the access to the database nodes 102 can be isolated via another dedicated partition, while the database nodes 102 can be shared by all tenants running on the compute nodes 101. On the other hand, the database nodes 102 can have access to both partitions using different networking interfaces.

As shown in FIG. 1, the compute node 101 can support one or more virtual machines (VMs), e.g. VMs 111-112, each of which can be assigned with a VM identifier. The VM identifier, which is assigned at the VM deployment time, can be enforced using hardware. The VM identifier may appear in each packet transmitted by the VMs 111-112. Furthermore, the VM identifier, which can be used to control the access of a VM to the database, may not be manipulated by the VM itself. Additionally, the VM identifier can change throughout a VM life cycle (i.e. the VM identifier is not persistent).

As shown in FIG. 1, the multi-tenant environment 100 can ensure secure access to the database instance 113 by the VMs 111-112. For example, the system can be based on an access control mechanism at the networking layer and a workload inspection mechanism at the application layer of database node 101 using VM identifiers appearing in each packet transmitted by the VMs 111-112 to database node 112. As shown in FIG. 1, access control 114 is transparent to the VMs 111-112 on the compute node 101 and can be enforced on the database node 102. The system can restrict the access by the VMs 111-112 to a specific database service, e.g. a specific database service provided by the database instance 113. For example, the VM 111 is allowed to access a database service provided by database instance 113, while the VM 112 is prevented from accessing the database service provided by database instance 113.

As shown in FIG. 1, the system can configure the control path for transmitting data packets to restrict address and route resolution to the specific database node 102. Also, the control path can be configured to restrict connection establishment to the specific database service. Additionally, the system can configure the data path for transmitting data packets to enforce data exchange access control in hardware, e.g. the host channel adaptor (HCA) of database node 102, and to avoid significant performance impact.

As shown in FIG. 1, the system can restrict the communication between the compute nodes 101 and the database nodes 102 to go through a secure communication channel 120. Note that whenever, as here, this detailed description references communication between the database nodes and the compute nodes, it is referring to communication between the database nodes and the VMs running on the compute nodes rather than the compute nodes themselves. The secure communication channel 120 can be based on IB reliable connection (RC) protocol with enhanced access control, and can prohibit TCP/UDP/SDP access to database over that networking interface. For example, in an embodiment, Oracle® Exadirect Secure can provide high-speed secure communication between the Exalogic compute nodes and the Exadata database nodes over an IB network. Oracle® Exadirect Secure may only be used by Java Database Connectivity (JDBC) and Oracle® Call Interface (OCI) Clients (i.e. effectively restricted to SQLNET).

As shown in FIG. 1, the system can additionally establish secure communication between the VM 111 and a specific database services provided by database instance 113, via a security appliance 104 that locates outside the IB subnet 110. For example, if an application on the Exalogic compute nodes does not use JDBC or OCI clients to interface with the Exadata database, then the Exalogic compute nodes can use separate Ethernet-based communication via security appliance 104 instead.

Figure 2:
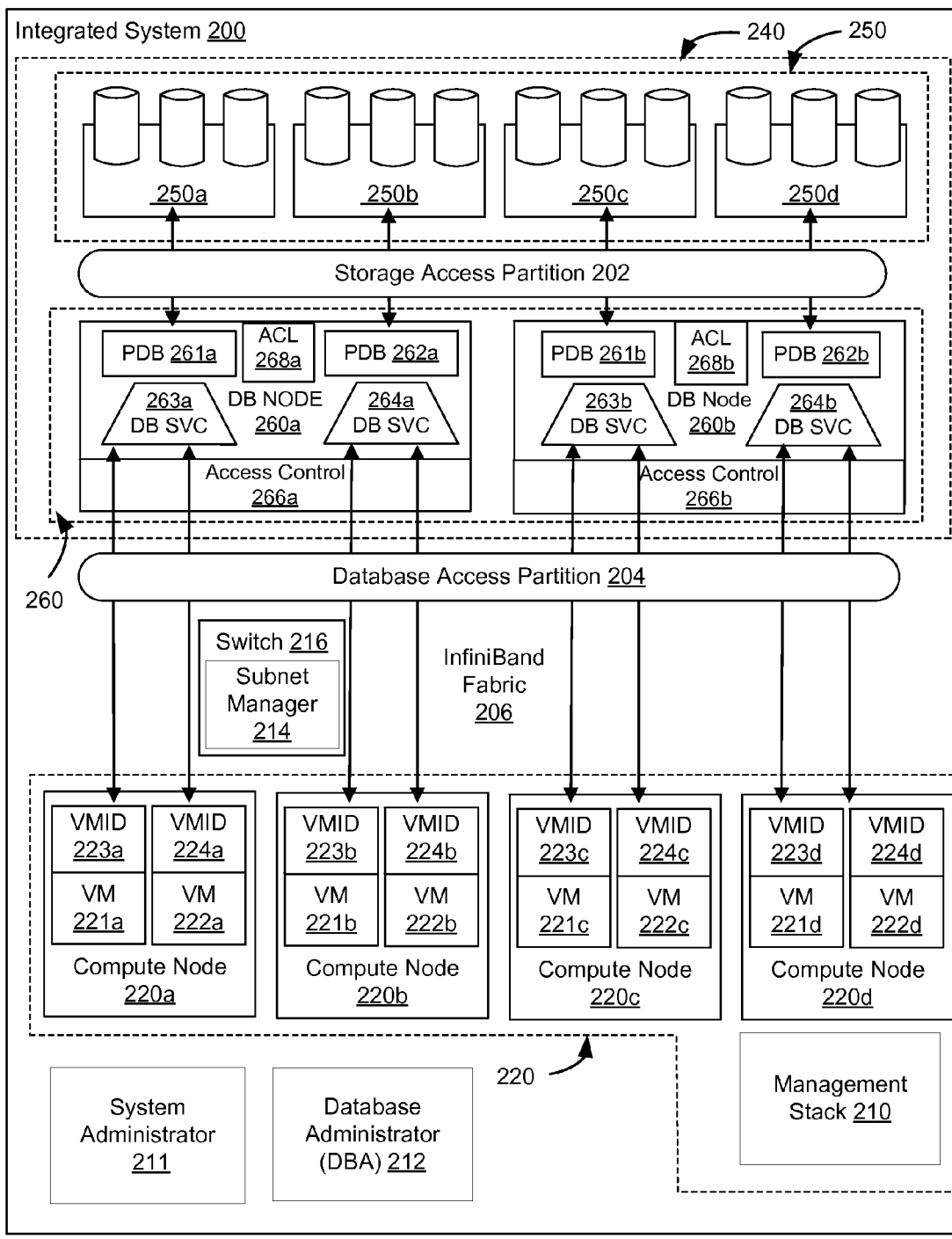
FIG. 2 illustrates access control in an integrated system having a database server system connected by a switched networking fabric to a middleware machine system, in accordance with an embodiment of the invention.

FIG. 2 illustrates access control in an integrated system having a database server system 240 connected by a switched networking fabric 206 to a middleware machine system 220, in accordance with an embodiment of the invention. The integrated system 200 provides access control functionality which overcomes the disadvantages presented by the conventional use of intermediary firewall appliance while providing a security solution that ensures the security of data in a multitenant environment. The security solution enables the use of a high speed connection-based networking fabric such as InfiniBand fabric 206 as well as optimizations that such a connection-based switched fabric can provide to operations performed between a middleware machine system 220 and a database server system 240. Integrated system 200, includes a database server system 240 connected by InfiniBand fabric 206 to a middleware machine system 220. In an embodiment, database server system 240 is an Oracle® Exadata database server system and middleware machine system 220 is an Oracle® Exalogic middleware machine system. The database server system 240 can be administered by database administrator (DBA) 212 and the integrated system 200 can be managed by system administrator 211 using management stack 210. The middleware machine system 220 includes a collection of virtual machines (database service consumers). Each virtual machine is assigned, at deployment time, a hardware enforced unique identifier (VMID). This identifier is allocated by the subnet manager 214, securely running on a switch 216 in the InfiniBand fabric 206, and embedded by hardware on each compute node of the middleware machine system 220 into the header of each packet generated by the virtual machine as part of a source global identifier (SGID) in the header. The system uses this unique VMID provided in the SGID of each packet identifier to securely identify each VM, and control access from that VM to the specific database service (database service provider). In embodiments, access to the database service is restricted not only by database foreground process, but also by the database listener, and HCA as described below. In alternative embodiments, access control can be applied to other database primitives, such as pluggable database (PDB), or database table.

The system includes access control measures which ensure that access to a specific database service provided by the database server system 240 is restricted to virtual machines of the middleware machine system 220 that have been granted access to that specific database service in an access control list (ACL) under control of management stack 210. Access may be granted for example only to those virtual machines associated with a particular tenant. The access control list (ACL) associates each named database service with a set of VM identifiers corresponding to the VMs that are allowed to access it. The access control system ensures that only VMs granted permission in the ACL with respect to a named database service will be allowed to access that named database service. The content of the ACL is under the secure control of an administrator of the integrated system using management stack 210.

As shown in FIG. 2, database server system 240 includes a plurality of storage cells 250. Four Storage cells are shown 250*a*, 250*b*, 250*c*, and 250*d*. A typical system may include a large number of similar storage cells. The storage cells store data/database files which can be associated with a particular tenant in a multitenant environment. As shown in FIG. 2, a dedicated storage access partition restricts access to the storage cells 250. Access to the storage access partition 202 is granted to the storage cells and database nodes only. Virtual machines on compute nodes 220a, 220b, 220c, and 220d are not granted access to the storage access partition 202 and thus cannot access the storage cells 250 directly.

Database server system 240 also include a plurality of database nodes 260. Two database nodes 260a, 260b are shown. A typical system will include a large number of similar database nodes. The database nodes 260a, 260b can access the storage cells 250a, 250b, 250c, and 250d via the storage access partition 202. Each of the database nodes 260a, 260b can host a plurality of database processes e.g. PDB 261a, 262a, 261b, and 262b each of which can provide a named database service e.g. DB SVC 263a, 264a, 263b, and 264b. Each named database service can be associated with one or more particular tenants. Storage cells 250a, 250b, 250c, 250d represent shared storage media. The particular storage cells need not be associated with or dedicated to particular tenants. In an embodiment the storage cells 250 represent a distributed storage array managed by the database nodes 260. Database files can be striped across multiple storage cells. However a wide variety of arrangements of the database files on the storage cells can be utilized under control of the database nodes 260. No additional security measures needed for access to the storage cells 250 because storage cells are isolated from the VMs of the compute nodes using a dedicated storage access partition 204. The storage access partition 204 is only available to the database nodes 260a, and 260b and the storage cells 250a, 250b, 250c, and 250d. Thus, the plurality of storage cells 250 is isolated from the middleware machine system 220 and the virtual machines on compute nodes 220a, 220b, 220c, and 220d.

The only way for the middleware machine system 220 to access database files stored on the plurality of storage cells 250 is indirectly through calling one or more of the tenant-specific named database services on the plurality of database nodes 260. Access to the database nodes 260a 260b is controlled and secured using Access Control 266a and 266b as described below. Access from the virtual machines on compute nodes to the database nodes is also constrained to a dedicated database access partition 204. This partition is different from the default partition, and is not used for communication between the virtual machines on different compute nodes themselves. If multiple tenants are deployed they all share the same database access partition 204 to access database nodes. All VMs are configured as limited members of the database access partition 204 in order to prevent communication between VMs using the database access partition 204. All database nodes are configured as full members of the database access partition 204.

Middleware machine system 220 includes a plurality of compute nodes of which four are shown 220a, 220b, 220c, and 220d. A typical system will include a large number of similar compute nodes. The compute nodes host applications (not shown) running in virtual machines. Each of the virtual machines can be assigned to a particular tenant in a multitenant environment. There can be a plurality of virtual machines (and applications) running on each compute node. Eight virtual machines are shown VM 221a, VM 222a, VM 221b, VM 222b, VM 221c, VM 222c, VM 221d, and VM 222d. A typical system will include a large number of similar virtual machines running on each compute node and on many additional compute nodes. Each virtual machine is associated with an identifier VMID 223a, VMID 224a, VMID 223b, VMID 224b, VMID 223c, VMID 224c, VMID 223d, and VMID 224d, by the hardware of the compute node hosting the virtual machine under control of the subnet manager 214. The VMs on compute nodes 220a, 220b, 220c, 220d can communicate with the plurality of database nodes 260 over the storage access partition 202 using a connection based reliable protocol. In a preferred embodiment the VMs on compute nodes 220a, 220b, 220c, and 220d can communicate with the plurality of database nodes 260 over InfiniBand fabric 206.

The hardware of compute nodes 220a, 220b, 220c, and 220d transmits communication packets between the applications on the virtual machines and the database nodes. The hardware of the compute nodes includes in a header of each packet, a source global identifier (SGID) including the VMID associated with the virtual machine communicating. Because the VMIDs are associated with the virtual machines in hardware, the virtual machines cannot spoof their identifiers, that is, they cannot use identifiers that they are not associated with by the hardware. Also, the hardware of the compute nodes ensures that all communication packets from virtual machines include in their header an SGID which includes the VMID of the relevant virtual machine when communicating with the database nodes over the database access partition 204.

As previously described, the only way for the virtual machines of middleware machine system 220 to access data on the plurality of storage cells 250 is by calling specific named database services on the plurality of database nodes 260. The virtual machines are not allowed to communicate over the storage access partition and thus cannot communicate with the storage cells directly. Each of the virtual machines can attempt to create a connection to any of the named database services. However, each database node includes access control functions 266a and 266b implemented in the hardware (for example the HCA) and the software of the database node. The access control functions 266a and 266b can identify from the SGID in received communication packets which virtual machine is trying to connect to a named service. The access control functions 266a and 266b provide access control functionality responsive to access control list 268a and 268b, which identifies which virtual machines can access which named services. The contents of the ACL is under the secure control of management stack 210 and copies of the ACL are distributed to each database node. Access control functions 266a, 266b can include one or more of address resolution access control, connection establishment access control, data exchange access control, and IPoIB access control.

Access control functions 266a 266b can prevent a virtual machine from establishing a connection with a particular database node if the VM is not authorized to access any database service provided by the particular database node. Access control functions 266a and 266b can also prevent a virtual machine from establishing a connection with and communicating with a particular database service unless the VM is authorized in the access control list to access the particular database service. In an embodiment of a multi-tenant environment, the access control list is configured such that only virtual machines associated with the same tenant as a particular database service can establish a connection and communicate with the particular database service. All connection requests from unauthorized virtual machines are denied. Access control can be performed at various stages in the lifecycle of a connection as described below.

Figure 3:
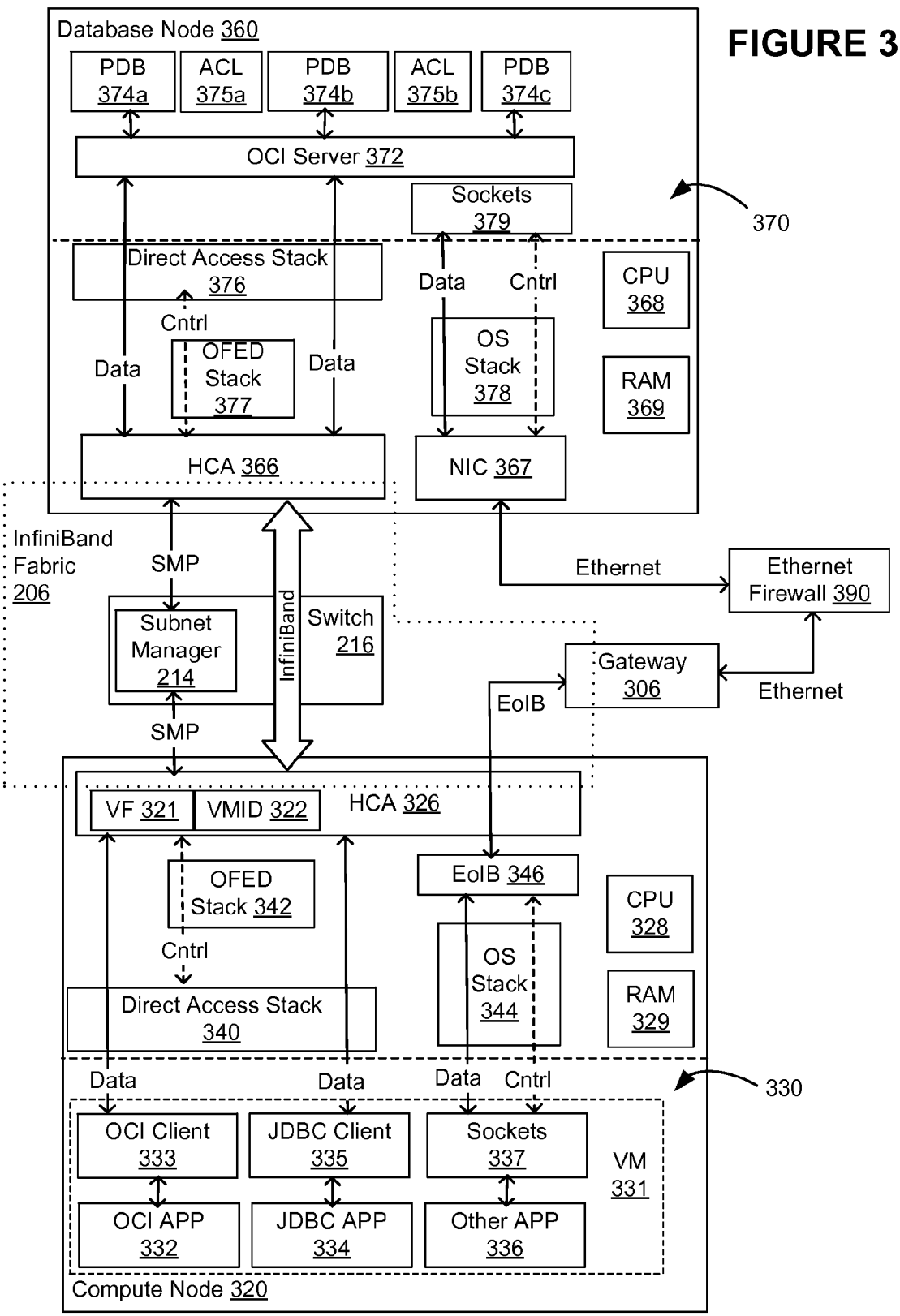
FIG. 3 illustrates access control in a database node of the database server system connected by a switched networking fabric to a compute node of the middleware machine system, in accordance with an embodiment of the invention.

FIG. 3 illustrates access control in a database node of the database server system 240 connected by a switched networking fabric such as InfiniBand fabric 206 to a compute node of the middleware machine system 220, in accordance with an embodiment of the invention. FIG. 3, illustrates a more detailed view of elements of the access control system which overcomes the disadvantages presented by the conventional use of intermediary firewall appliance while providing a security solution that ensures the security of data in a multitenant environment. FIG. 3 illustrates, for simplicity, features of one compute node 320 and one database node 360 connected by an InfiniBand fabric 206. One virtual machine 331 is illustrated on compute node 320. A typical system will however include many similar compute nodes, virtual machines, and database nodes connected by InfiniBand fabric 206.

As shown in FIG. 3, compute node 320 includes a host channel adapter (HCA) 326, a CPU 328 which can include one or more microprocessors each having one or more cores, and memory RAM 329 which can comprise four of more Gigabytes of memory. Compute node 320 hosts one or more applications in an application layer 330. Instances of one or more of these applications will run in virtual machines with each virtual machine associated with a unique VMID. A single virtual machine, VM 331, is shown, however multiple virtual machines may operate on a single compute node 320. Multiple applications may run in the same virtual machine or different virtual machines on the compute node. The applications can include for example one or more OCI Application 332 which uses an OCI Client 333 to communicate with a database using the Oracle® Call Interface. The applications can include one more JDBC Application 334 which uses a JDBC Client 335 to communicate with a database using Java Database Connectivity.

The OCI Client 333 and JDBC Client 335 can send and receive data using remote direct memory access (RDMA) via Direct Access Stack 340 and HCA 326 using Single Root I/O Virtualization (SR-IOV) technology in using a virtual function (VF) attached to each virtual machine hosting an application instance in the application layer. As shown in FIG. 3, a virtual function (VF) 321 of HCA 326 is attached to VM 331. Data can be sent directly to and from memory associated with particular virtual machines of the application layer. An Open Fabric Enterprise Distribution (OFED) Stack 342 provides for connection control for the RDMA switched fabric (in this case the InfiniBand fabric 206).

The Single and Multi-root IO Virtualization technologies are defined in standards specifications published by PCI-SIG. Certain aspects of Single Root I/O Virtualization (SR-IOV) Technology, RDMA and virtual function attached to virtual machines is described for example in U.S. Patent Application titled "SYSTEM AND METHOD FOR SUPPORTING LIVE MIGRATION OF VIRTUAL MACHINES IN A VIRTUALIZATION ENVIRONMENT", application Ser. No. 13/838,121, filed Mar. 15, 2013; and U.S. Patent Application titled "SYSTEM AND METHOD FOR SUPPORTING LIVE MIGRATION OF VIRTUAL MACHINES BASED ON AN EXTENDED HOST CHANNEL ADAPTOR (HCA) MODEL", application Ser. No. 13/838,275, filed Mar. 15, 2013; and U.S. Patent Application title "SYSTEM AND METHOD FOR SUPPORTING LIVE MIGRATION OF VIRTUAL MACHINES IN AN INFINIBAND NETWORK", application Ser. No. 13/837,922, filed Mar. 15, 2013, which applications are incorporated herein by reference.

An advantage of SR-IOV technology is that the virtual machines are granted direct hardware access via a PCIE virtual function (PCIE VF). This provides the same performance as physical deployment and supports user-level networking and RDMA providing linear performance scalability with the number of VMs. SR-IOV is therefore required to take full advantage of high speed interconnect such as an InfiniBand fabric. However, unlike software I/O virtualization technologies such as paravirtualization, with SR-IOV there is no intermediary software to control access to the VM. Thus, where the VM networking stack is untrusted, there is no trusted software intermediary to intercept and filter networking traffic. Thus, in order to fully utilize SR-IOV technology while providing access control, a secure VM Identifier (VMID) is made visible on the network and access control is mediated by the external entity or Service Provider (Database) as described herein. As shown in FIG. 3, database node 360 includes a host channel adapter (HCA) 366, a CPU 368 which can include one or more microprocessors each having one or more cores, and memory—RAM 369 which can comprise four of more Gigabytes of memory. Database node 360 hosts one or more database processes in an application layer 370. The database processes can include for example one or more OCI server application 372 which uses the Oracle® Call Interface to communicate with the virtual machines on the compute nodes. Application layer 370 can also host a plurality of database process instances (three shown) PDB 374a, 374b, 374c. The OCI server application can send and receive data using remote direct memory access (RDMA) via direct access stack 376 and HCA 366 using Single Root I/O Virtualization (SR-IOV) Technology. Data can be sent directly to and from memory associated with particular virtual machines of the application layer. An Open Fabric Enterprise Distribution (OFED) Stack 377 provides for connection control for the RDMA switched fabric (in this case the InfiniBand fabric 206). In embodiments of the present invention, access control can be implemented in various components of the database nodes including for example, OFED Stack 377, HCA 366 and OS Stack 378 based on access control lists.

The InfiniBand Fabric 206 includes a plurality of switches 216 (one shown) to which the HCA 326 of compute node 320 and HCA 366 of database node 360 are connected (in addition to the plurality of HCAs of a plurality of other compute nodes and databases nodes not shown). InfiniBand (abbreviated IB), is a computer-networking communications standard used in high-performance computing, features very high throughput and very low latency. It is used for data interconnect both among and within computers. InfiniBand is utilized as either a direct, or switched interconnect between servers and storage systems, as well as between storage systems. InfiniBand uses a switched fabric topology, as opposed to shared medium technology such as Ethernet. All transmissions begin or end at an HCA. In the system of FIG. 3, HCA 366 is connected to HCA 326 by the InfiniBand fabric 206 through switch 216 without any intermediary firewall appliance or node.

The InfiniBand fabric 206 implements one or more subnet manager 214 which is responsible for configuration of the InfiniBand fabric 206, and route resolution used in the process of IB connection establishment. The subnet manager 214 also configures the HCAs 366, 326 attached to the subnet through secure subnet management packets (SMP). In embodiments of the present invention, the subnet manager 214 can be used to securely configure the HCAs in the subnet with virtual machine identifiers (VMIDs) associated with particular virtual functions associated with particular virtual machines. As shown in FIG. 3, for example, VMID 322 is associated with virtual function 321 of HCA 326 which is attached to virtual machine 331.

The subnet manager 214 can also be used to securely configure the HCAs in the subnet such that each communication packet transmitted between a virtual machine on a compute node and a database node includes a global routing header (GRH) which includes a source global identifier (SGID) which includes the virtual machine identifier (VMID) associated with a particular virtual function associated with a particular virtual machine. As shown in FIG. 3, for example, each communication packet transmitted between virtual machine 331 of compute node 320 and a database node includes a global routing header (GRH) which includes a source global identifier (SGID) which includes the VMID 322 associated with the VF 321 attached to the virtual machine 331. Thus association of the VMIDs with virtual machines, and inclusion of SGIDs in communication packets is under the secure control of the subnet manager 214 and HCAs and cannot be spoofed or corrupted by the compute node 320 or VMs on the compute node. Thus, even a user or application with root access to the compute node will not be able to alter the VMIDs and SGIDs include in packet headers or use unauthorized VMIDs/SGIDs.

In embodiments, the OFED Stack 377 and HCA 366 of each database node 360 implement access control based on one or more access control list (ACL) 375a, 375b. The access control uses the SGIDs embedded in the InfiniBand packets to identify the virtual machine associated with the packets. The OFED Stack 377 and HCA 366 implement access control based on one or more access control list (ACL) 375a, 375b to prevent the establishment of connections and transmission of data between virtual machines in the compute nodes and database processes unless authorized by the appropriate ACL. Note however, that should a connection be made and communication allowed between an authorized virtual machine and database process, the connection allows full direct RDMA over InfiniBand between an OCI Client 333 instance on the compute node 320 and the OCI Server 372 and the database node 360 without the need for an intermediary firewall appliance (such as e.g. Ethernet firewall 390). A VM once authorized by access control logic and hardware is granted direct hardware access (via PCIE VF) to a database service with the same performance as physical deployment using a connection that supports user-level networking and RDMA without any intermediary software to control access to VM resulting in linear performance scalability with number of VMs and taking full advantage of the high speed InfiniBand interconnect with data exchange access enforced by the HCA hardware of the database node.

The applications on compute node 320 can also include one more other application 336 which does not use JDBC or OCI is therefore precluded from utilizing direct access stack 340 for RDMA but instead use Sockets 337 to communicate with a database over Ethernet. Sockets 337 are coupled via an OS Stack 344 to an Ethernet over InfiniBand (EoIB) adapter 346. Ethernet packets are sent out using EoIB to Gateway 306 which retransmits the packets over an Ethernet network external to InfiniBand fabric 206. The Ethernet communications pass through a conventional Ethernet firewall appliance 390 before reaching database node 360. At database node 360, the Ethernet communications are received with Network Interface Card (NIC) 367 from Ethernet firewall appliance 390 and transmitted via OS Stack 378 to Sockets 379. It should be noted that this connection path features higher overhead in several aspects including processor overhead in reading/writing sockets 379, OS Stack overhead, and inclusion of Gateway 306 and Ethernet firewall 390 is the communication path.

Figure 4A:
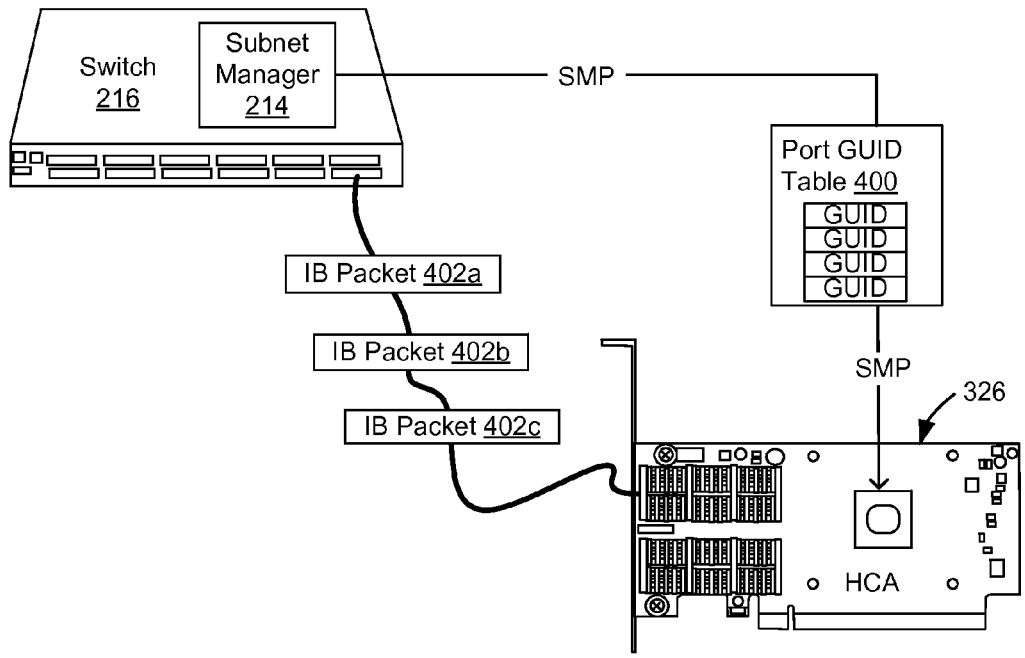
FIGS. 4A-4C illustrates aspects of a system and method for securely embedding source identifiers in communication packets from virtual machines on compute nodes of the middleware machine system, in accordance with an embodiment of the invention.
Figure 4B:
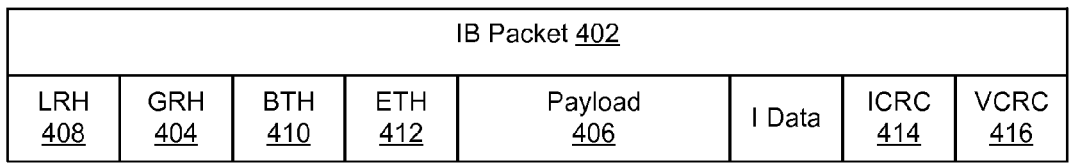
Figure 4C:
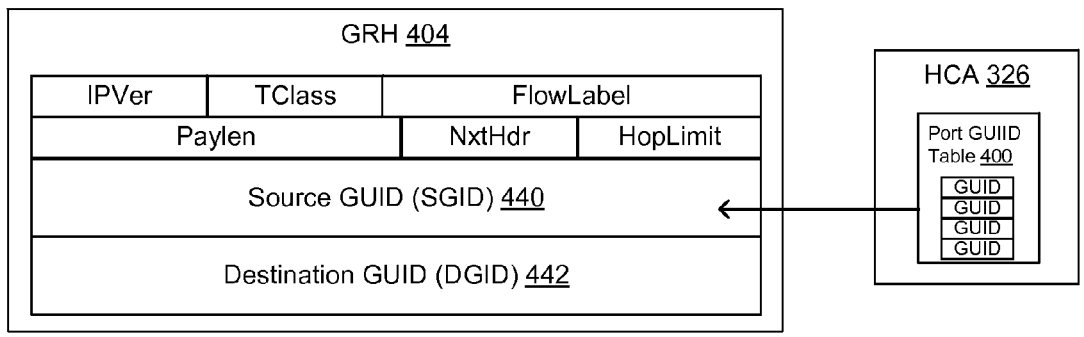

FIGS. 4A-4C illustrates aspects of a system and method for securely embedding source identifiers (SGIDs) in headers of communication packets sent from virtual machines on compute nodes of the middleware machine system to database nodes of the database server system. FIG. 4A illustrates embedding of virtual machine identifiers (VMIDs) in SGIDs of headers of InfiniBand packets using host channel adapter hardware under the control of a secure subnet manager. As shown in FIG. 4A, switch 216 implements subnet manager 214 which is responsible for configuration of the InfiniBand fabric 206, and route resolution used in the process of the IB connection establishment. The subnet manager 214 also configures all HCAs attached to the subnet through secure subnet management packets (SMP) which can be sent in-band.

In embodiments of the present invention, the subnet manager 214 is used to securely configure all HCAs in the subnet with virtual machine identifiers (VMIDs) associated with particular virtual functions associated with particular virtual machines. Each subnet manager 214 uses subnet management packets to configure a port global unique identifier (GUID) table 400 stored in secure memory of HCA 326. A different port GUID table is configured in each HCA connected to the subnet. The port GUID table 400 is used in HCA 326 to associate each virtual function (VF) and hence each virtual machine with a GUID established by the subnet manager 214 for use as a VMID. Thus, association of the VMIDs with virtual machines is under the secure control of the subnet manager and cannot be spoofed or corrupted by the virtual machine.

Subnet manager 214 also configures the database access partition such that HCA 326 includes the GUID in a Global Routing heading (GRH) in each InfiniBand packet 402a, 402b, 402c transmitted by the HCA 326 towards a database node. In an embodiment, the subnet manager 214 instructs the software stack to use GRH on connections between the virtual machines on the compute nodes and the database nodes. When GRH is specified for the connection, the hardware (e.g. HCA 326) will include the GRH in all packets sent over the connection. The VMID is included in the global routing header as the GRH.SGID which is a concatenation of the GUID of the attached VF (VMID) and the Subnet Prefix. The GRH is typically not transmitted in InfiniBand packets when the InfiniBand packets are transmitted between endpoints within a single subnet. One way for subnet manager 214 to ensure that each InfiniBand packet transmitted by the HCA 326 to a database node includes the GRH is to identify all the database nodes as part of a separate subnet than the compute nodes—the HCA will then include the GRH in all InfiniBand packets according the standard protocol for communication between different subnets over InfiniBand. Alternatively, subnet manager 214 can specify a change in policy which requires transmission of the GRH in all InfiniBand packets even within the same subnet.

In an embodiment, the subnet management partition command is extended to include a GRH flag. The GRH flag is configured by subnet manager 214 at partition creation time. When a path resolution for a connection specifies the database access partition 204 (see FIG. 2) the GRH flag requires inclusion of the GRH in every InfiniBand packet. Note that the access control functionality of can be applied to certain network interfaces e.g. database access partition 204 and not applied to other network interfaces e.g. storage access partition 202. Thus, the GRH flag need not be set in the storage access partition 202 because GRH inclusion is not needed. In an embodiment, the subnet manager 214 sets the HopLimit attribute of the path resolution management datagram for the database access partition 204 to a value larger than 1 in order to provoke GRH inclusion. By setting the HopLimit attribute greater than 1, the subnet manager 214 creates an illusion that the database nodes and compute nodes belong to different subnets thereby triggering inclusion of the GRH in every InfiniBand packet sent from the virtual machines of the compute nodes to the database nodes over the database access partition.

FIG. 4B illustrates an InfiniBand Packet 402 using InfiniBand (IB) addressing to access a data service in a network environment. As shown in FIG. 4B, the IB packet 402 includes the payload 406 and various headers according to the IB protocols including the local routing header (LRH) 408, and other headers 410,412. The local routing header (LRH) is used by switches to move a packet across a subnet to its destination end node network port. It contains the source and destination local identifiers (LIDs), link protocol version ID, service level, virtual lane, packet length, and a "next header" field used to indicate which optional fields are present. Additionally, the IB packet 402 can include an invariant ICRC 14, variant VCRC 416 which are used to ensure integrity of the IB packet. As described above, the subnet manager 214 configures the subnet and/or the HCA such that the headers of each IB Packet 402 transmitted in the database access partition 204 also include the global routing header (GRH) 404. The GRH 404 is embedded by the hardware of HCA 326 into each IB packet. The VMID is included in the GRH header as the GRH.SGID which is a concatenation of the GUID of the attached VF (VMID) and the Subnet Prefix.

FIG. 4C illustrates elements of the global routing header (GRH) 404. The GRH is typically used by routers to move packets between different subnets. In embodiments of the present invention it is used to ensure that the GUID of the source of the IB packet is embedded in each packet such that virtual machines may be identified. As shown in FIG. 4C, GRH 404 includes the Source GUID 440 and the Destination GUID 442. GRH 404 also includes a routing version ID, payload length, IP version, traffic class, and hop limit. As shown in FIG. 4C, the Source GUID 440 is embedded in the GRH 404 of IB Packet 402 by the hardware of HCA 326 based on the port GUID table 400 stored in HCA 326. As previously described the port GUID table 400 is securely configured by the subnet manager 214. Thus, each InfiniBand packet includes a Source GUID 440 which uniquely identifies the virtual machine associated with the packet. The Source GUID 440 is implemented by the hardware of HCA 326 under the control of subnet manager 214 and cannot be modified by the compute node of virtual machines it hosts. The VMID is include in the SGID because the GRH.SGID, is a concatenation of the GUID of the attached VF (VMID) and the Subnet Prefix. A virtual machine on the compute node is thus incapable of using any Source GUID not assigned to it by the subnet manager 214.

Management Stack

A management stack 210 (see FIG. 2) orchestrates the deployment of virtual machines, and manages access from those VMs to the specific database services of the database server system 240 using an access control list (ACL). The ACL table contains all the information required to control access of any middleware machine system VM to each specific database service. The virtual machines are not aware that communication with database nodes is access controlled because all access control is performed by the software and hardware running on the database nodes, and is thus transparent to the virtual machines on the compute nodes of the middleware machine system 220.

Figures 5A, 5B:
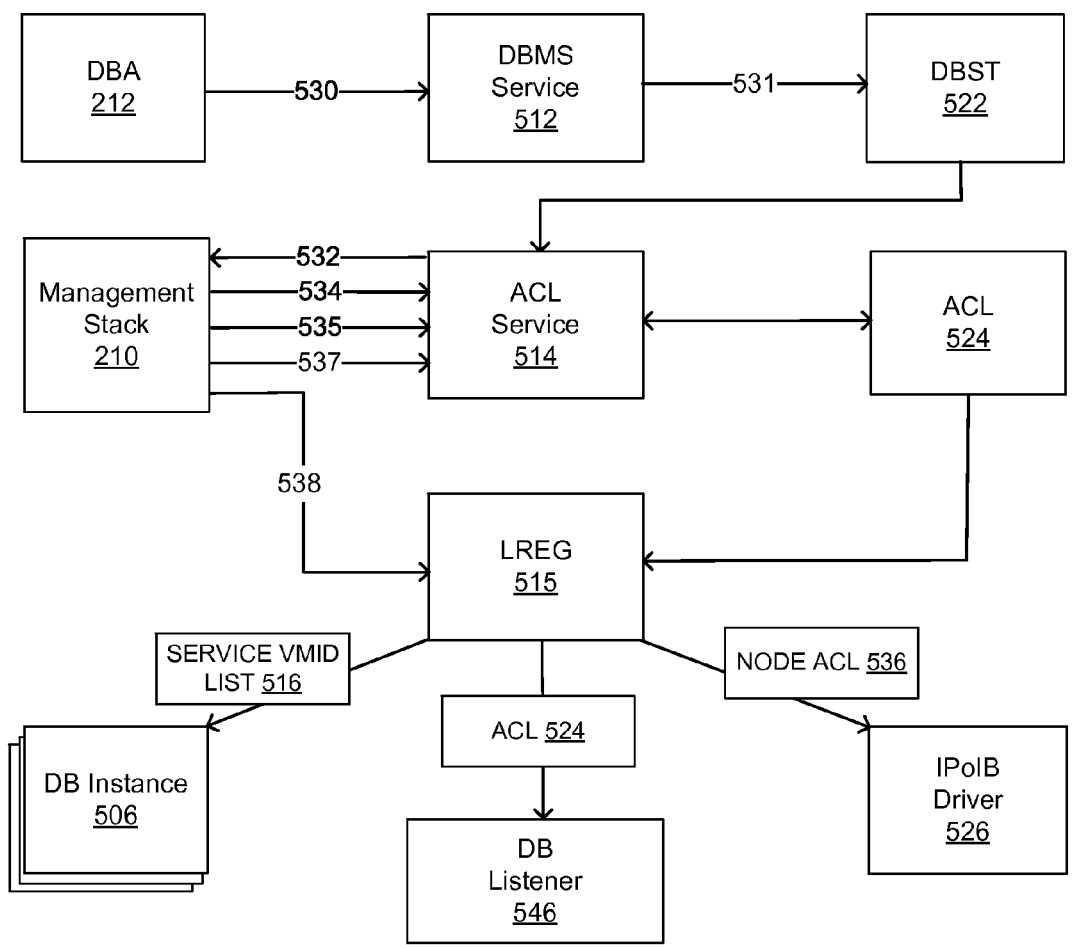
FIG. 5A illustrates an access control list, in accordance with an embodiment of the invention.
FIGS. 5B and 5C illustrate systems and methods for creating, updating and distributing the access control list of FIG. 5A, in accordance with an embodiment of the invention.

FIG. 5A illustrates an access control list (ACL) 524. As shown in FIG. 5A, ACL 524 has a row for each named database service—Svcname 1-N. For each named service, ACL 524 indicates which virtual machines (identified by VMID) are allowed to access the named service. ACL 524 allows complete granularity of named service to VMID permissions and is populated as shown in FIG. 5B. In embodiments the ACL is configured such that VMs associated with a particular tenant can only access named database services associated with the same tenant in a multitenant environment. However, ACL 524 allows complete granularity of named service to VMID permissions thus the ACL may be configured such that some database services may be shared and thus accessed by VMs associated with two or more tenants. Logically, the database ACL table can be arranged as follows: Rows representing individual VMs with their currently assigned VMID; and Columns representing names of the database services allowed to be accessed by the specific VMs.

The database ACL table is a database table created specifically for the access control system described herein. A PL/SQL package provides the management stack 210 with an API allowing management of this table without exposing internal details of the actual table implementation. Only the management stack 210 will update the database ACL table. A dedicated database service can be created to access the database ACL table. Names of the database services used to access database ACL table should be known to the management stack 210, and are provided either via APIs or configuration files, depending on the management stack deployment option used. The management stack 210 can use a dedicated Management database access partition to access database ACL table, preferably using SQL over TCP. Access to the management database access partition is restricted to the management stack 210 only.

A database listener 546 (see FIG. 5B) is used to provide access for the management stack to the database ACL tables on all databases deployed on the database server system. The number of database listeners and their coordinates are provided to the management stack 210 as configuration attributes. The management stack communicates with the PL/SQL procedure running on one of the database nodes. It is a responsibility of the database server system to propagate database ACL table updates to all database nodes, all DB listeners 546 and IPoIB drivers 526 running on those nodes (see FIG. 5B).

The system administrator can configure VMs deployed on the middleware machine system compute nodes with access to one or more database services. The database services should be associated with the same tenant that the VM is deployed in and the management stack 210 enforces this restriction. The management stack 210 persists the VMID to database service(s) association in the local database or configuration file. Additionally, the management stack 210 is able to use this information to build/rebuild the database ACL table.

In the ACL, each VM is associated with database services which it is authorized to access based on that VM's unique VMID and the given database service name. The management stack is responsible for tracking the association of VM and VMID, and updating the database ACL table appropriately throughout the VM lifecycle. At VM deployment a new entry carrying the VM UUID is added to the database ACL table by the management stack. This entry will eventually be updated with the VMID and one or more database service names. During subsequent VM life cycle operations an entry might be updated with a new VMID assigned to that VM or new database service(s) with access granted or revoked. The VF is hot-plug attached to the booting VM and each time a given VM is started a different VF can get attached and thus result in a different VMID for the given VM. This change in VMID requires the management stack to update the VMID to database service association in the ACL. This VM entry will remain in the database ACL table until the VM is destroyed. If a VM attempts to access the database before the management stack completes an update of the database ACL table and the update is propagated to all database nodes, and Listeners and IPoIB drivers the VM may be refused access until after the update is complete.

FIG. 5B illustrates database services interacting with ACL 524 of FIG. 5A. As shown in FIG. 5B, at step 530, a database administrator (DBA) 212 accesses database management system service (DBMS) 512 to configure a named database service. At step 531, DBMS service adds the named database service to database service table (DBST) 522. At step 532, management stack 210 uses ACL service 514 to retrieve the list of names services from DBST 522. At step 534, management stack 210 adds the new named database service to ACL 524. At step 535, management stack 210 sets VMID permissions for the new named database service in ACL 524. At step 537, management stack 210 commits the transaction adding the new named database service to ACL 524. Following commitment of the modification to ACL 524, at step 538 the modified ACL 524 is pushed out to all database instances via a listener registration (LREG) process 515. Thus, all database instances are provided with an up-to-date version of ACL 524. LREG 515 updates the ACL table in each database instance 506. Each database instance receives a service VMID List 516 which lists all VMIDs authorized for the particular service. LREG 515 also pushes the ACL 524 to the database listener 546. THE ACL 525 provided to the database listener 546 identifies the database services on the node and the VMIDs authorized for those services. LREG 515 also updates the IPoIB driver 526 using the sysfs/ioctl interface with node ACL 536 which includes a list of all VMs (by VMID) authorized to access the particular node.

Figure 5C:
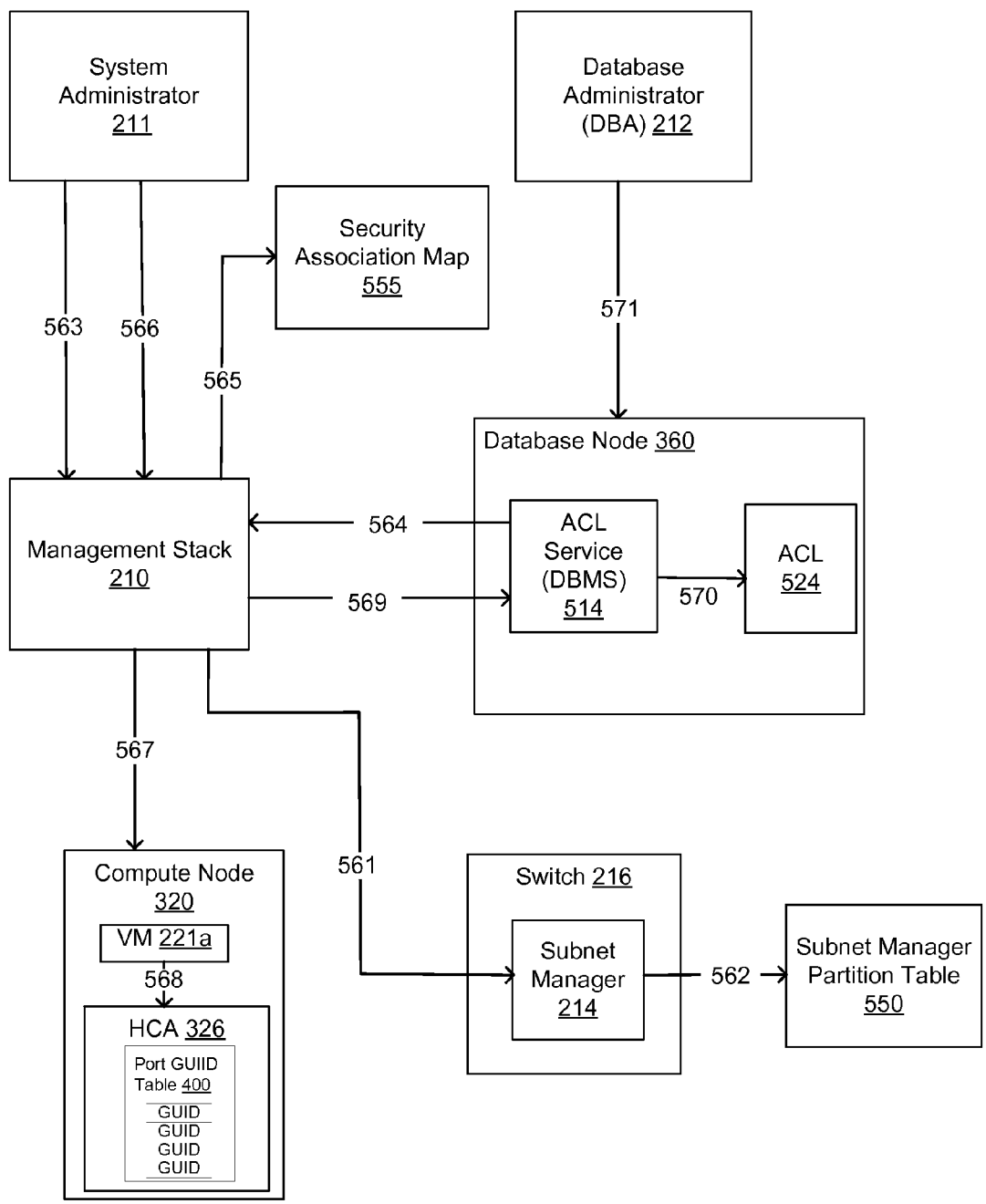

FIG. 5C illustrates management of the access control system. The Integrated System 200 involves multiple components that are configured, coordinated and managed in order to implement the system and method for providing an integrated firewall for secure network communication in a multi-tenant environment disclosed herein. There are alternative deployment models, each providing a management solution specific to that deployment. FIG. 5C shows the high-level management model of the access control solution and the high-level management steps that are involved in configuration of Integrated System 200 to implement the access control solution.

As shown in FIG. 5C, at steps 561 and 562 the database access partition 204 (see FIG. 2) is created with a GRH flag set in the subnet manager partition table 555. This GRH flag is used by the subnet manager 214 to indicate that all paths between virtual machines on compute nodes and database nodes must be configured with global routing headers (GRH). This operation is performed as part of setup of the InfiniBand fabric 206 connecting the virtual machines deployed on the compute nodes to the database nodes. At steps 563, 564, and 565 management stack 210 retrieves current database configuration (list of service names configured for databases), and creates associations between the service names and the authorized VMs/tenants, and persists this association within the security association map 555 within management stack database. Database service names should be unique across all deployed databases and the management stack 210 is responsible to identify any database misconfiguration, or duplicate service names at this step of configuring the system.

At steps 566, 567, 568, upon VM instantiation, the Management stack 210 associates each VM with its VMID and associated the VMID with one or more service names associated with the particular authorized tenants established in step 565, selects a compute node (e.g. 320) for VM deployment and deploys the VM (e.g. VM221a) on the selected compute node. A virtual function VF is assigned and attached to the VM on instantiation and obtains that VM's identifier (VF GUID) from port GUID table 400 of the HCA 326 of the compute node 320 to which the VM 221a is deployed. At steps 569, 570 the management stack 210 updates the database ACL 524 with the association of service name and the VMIDs established in from step 569. Upon update of the database ACL table, the information is propagated to the database nodes (e.g. database node 360), and within each node to the database listeners and IPoIB driver on each node as described in FIG. 5B. Database administrator 212 may configure database services on the database nodes in the normal fashion.

Note that multiple VMs may be granted access to the each specific database service, and that a single VM may be granted access to multiple database services. The access granted is completely granular as per the ACL table and can be configured as necessary to isolate VMs associated with particular tenants from database services associated with other tenants or to share particular database services between VMs of different tenants as necessary or desirable for the particular service. The system administrator 211 maps database service names to different tenants in a multitenant environment.

The management stack 210 responsible for configuration of the security system may run on a compute node of the middleware machine system 220 and use the InfiniBand fabric 206 for communication with the database nodes in order to retrieve database service configuration information and program the required database ACL tables. The management stack can use a dedicated database management access partition for this purpose. Access to this partition will be granted only to the Management stack, and thus this networking interface on the database nodes does not have to be protected by the security measures described herein. The management stack 210 uses APIs provided by the PL/SQL procedures running on the database nodes and accessible over TCP. These procedures are enhanced to allow access and control of the database ACL table to be performed only via a networking interface associated with the database management access partition. In alternative embodiments, the management stack can be deployed on the database server system 260 or uses Ethernet to communicate with the database nodes, standard Ethernet security mechanisms would be used to ensure secure communication between the management stack 210 and the database nodes.

Access Control

As described above, VMIDs are embedded in each packet transmitted in the database access partition as part of the GRH.SGID and identify VMs originating the packets. The access control list specifies which VMs can access which services. Access Control is then implemented in the database nodes using the VMIDs provided in the GRH.SGID of each packet and the ACL. The ACL 524 and the sub-tables, such as service VMID List 516 and node ACL 536, can be utilized to provide access control at several different stages in the lifecycle of a connection between a compute node virtual machine and a database service, including Address Resolution, Path Resolution, Connection Establishment and Data Exchange. It should be noted that for the system described above, the access control measures described below need only be performed on the networking interface used for communication between the database nodes and VMs on the compute nodes i.e. the network interface for the database access partition. These access control measures need not be applied to the network interface used for communication between the database nodes and the storage cells i.e. the network interface for the storage access partition. These access control measures also need not be applied to the network interface used for communication between the VMs on compute nodes and VMs on other compute nodes.

Granularity of the access control varies depending on the connection lifecycle phase. During the Address Resolution and Path Resolution phases, the system can control access to the specific database node based on node ACL 536. That is, a virtual machine can be provided address and path information only for database nodes providing one or more database service which the virtual machine is authorized to access. During the Connection Establishment and Data Exchange phases, the system controls access and data transfer between VMs and specific named database services based on the ACL 524 and/or service VMID List 516.

Address Resolution Access Control

One mechanism implemented in the database nodes for providing access control at a stage in the lifecycle of a connection between a virtual machine and a database service is Address Resolution Access Control. Address Resolution Protocol (ARP) communications are used by the VMs as an initial part of a process for connecting to a database node which provides a particular named database service. ARP is used to resolve IP Address to the hardware address (MAC address in case of Ethernet, or 20 byte IPoIB hardware address defined by IPoIB standard. ARP communications are exchanged between the VMs deployed on the compute nodes and the database nodes using IPoIB communication. VMs send out multicast ARP requests from the compute nodes and database nodes send back unicast ARP responses (if permitted). Both the multicast requests, and the unicast responses exchanged between the database nodes and the VMs are required to carry the global routing header (GRH) and therefore identify the VM by providing the VMID in the GRH.SGID.

Address Resolution access control, is performed by matching the VMID from the GRH.SGID of the incoming Address Resolution Protocol (ARP) requests with the node ACL 536 programmed for the specific database node which identifies VMs authorized to access the database node. As described above, the node ACL 536 is provided to the IPoIB driver 526 on each database node using the sysfs/ioctl interface for the specific IPoIB networking interface. VMIDs can be added or deleted from the node ACL. Thus, the IPoIB driver of each database node is configured with a list of VMIDs of VMs that are allowed access to the database node over a specific networking interface. The IPoIB driver 526 can use the node ACL to perform access control by declining to provide ARP responses to VMs not authorized to access the database node. To put it another way the IPoIB driver 526 does not respond to ARP requests unless the GRH.SGID includes a VMID in the node ACL.

Upon receipt of an ARP request from a VM, the IPoIB Driver 526 of the database node checks the request to verify that a GRH is present in the packet—if there is no GRH, the request is discarded and no response is made. Next the IPoIB Driver 526 of the database node matches the SGID in the GRH of each inbound ARP Request/Response with the node ACL—if there is no match, the request is discarded and no response is made. Next the IPoIB Driver 526 of the database node matches the SGID in the GRH of each inbound ARP Request/Response with the lower 128 bits of the source hardware address from the ARP request/response body, if there is no match, the request is discarded and no response is made. The last check is intended to make sure that the hardware address programmed into the ARP cache carries a valid SGID of the corresponding VM, and can be used for identification of sockets created by the VM. Only if the GRH is present, and the SGID matches the node ACL 536, and the lower 128 bits of the source hardware address from the ARP request/response body is an ARP response sent back to the virtual machine on the compute node.

Thus the ACL controls access to address resolution information to only those VMs identified by SGID in the node ACL 536. Thus, VMs cannot receive address resolution information from database nodes which they are not authorized to access. Consequently, the database nodes (and database services they provide) are effectively "invisible" to VMs which are not authorized to access them according to the node ACL 536.

Connection Establishment Access Control

Another mechanism implemented in the database nodes for providing access control at a stage in the lifecycle of a connection between a virtual machine and a database service is Connection Establishment Access Control. When a VM has located a database service to which it wishes to connect, it will attempt to establish a connection with the database service. A database node performs connection establishment access control using information provided by the Open Fabrics Enterprise Distribution (OFED) which provides an open-source software stack for RDMA and kernel bypass applications. In embodiments, the system is configured such that all communication between a virtual machine on a compute node and a database node, with the exception of ARP traffic and TCP sockets used for control operations, is constrained to the communication over InfiniBand reliable connection transport with packets containing GRH headers. Connection establishment access control is performed by confirming that connection requests do carry GRH headers and that the GRH.SGID identifies a VMID corresponding to a VM which is authorized to access to the specific named database process as indicated by the access control list.

Figure 6:
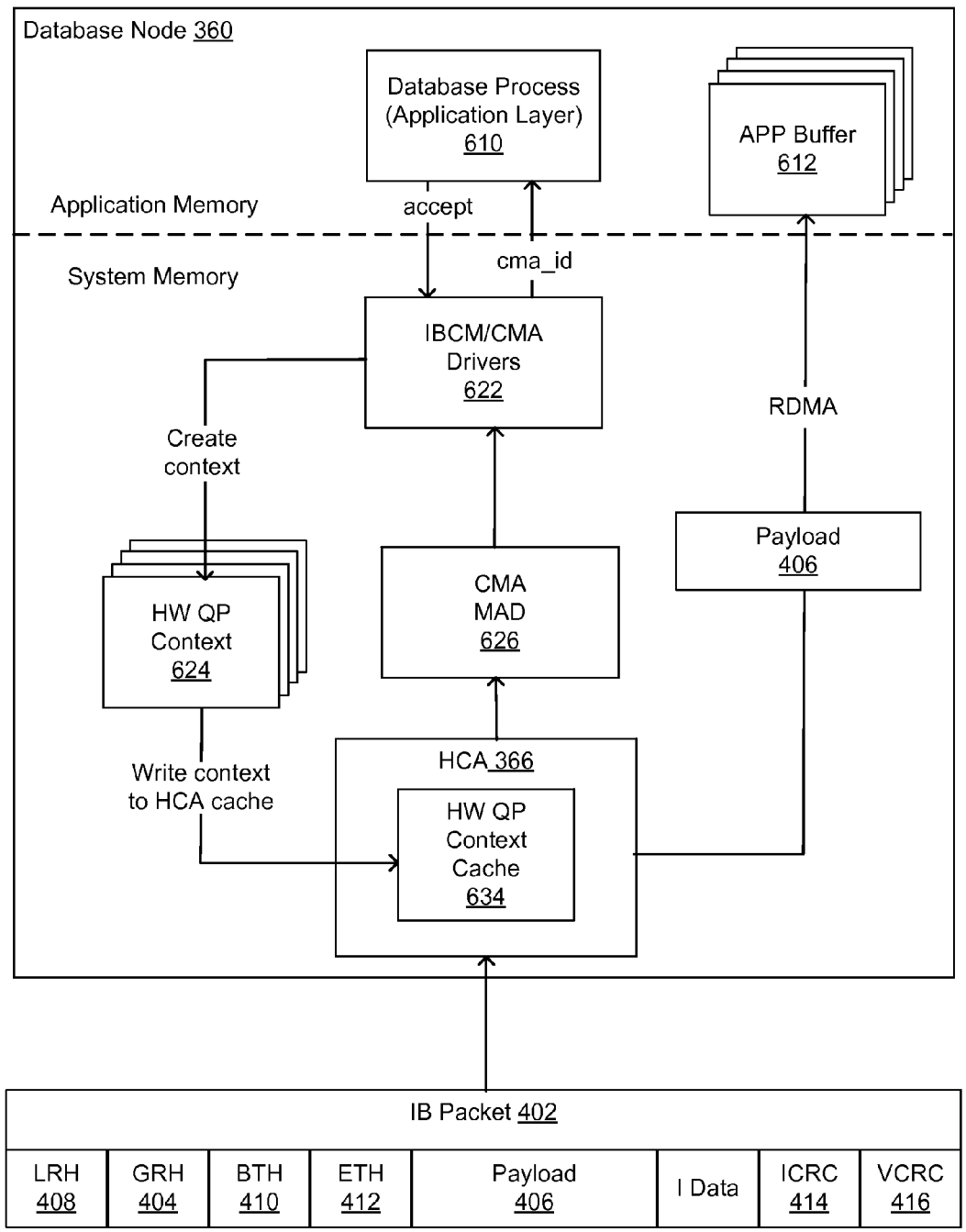
FIG. 6 illustrates aspects of connection establishment access control and data exchange control performed at a database node based on the access control list of FIG. 5A, in accordance with an embodiment of the invention.

FIG. 6 illustrates aspects of Connection establishment Access Control. The Connection Manager (Connection Manager Agent) implements InfiniBand connection establishment protocol as defined by the InfiniBand specification. Connection establishment is performed using connection management datagrams (MADs), which carry information necessary for connection establishment. As described above, in embodiments of the present invention, Connection Management Datagrams (MADs) on the paths between the database server system and the middleware machine system are required to carry GRH headers. The Connection Management Agent (CMA) 622 running on the database node 360 performs the following filtering operations during connection establishment. When CMA 622 receives CMA MAD 626, it verifies that a GRH is present in the MAD and if not, discards the CMA MAD without response. Optionally, CMA 622 may validate that Alternative Path is not valid in the CMA MAD 626—Alternate Path Management (APM) is preferably prohibited—if APM is specified, the CMA MAD may optionally be discarded without response. Next CMA 622 matches the SGID from the GRH of the CMA MAD with the primary path SGID from the body of the CMA MAD 626—if there is a mismatch, discard the connection management MAD without response. These steps by the CMA validate that the remote address provided in the connection establishment event to the upper layer (application or IPoIB) contains a valid SGID corresponding to the remote VM, so that this SGID can be used by the upper layer for the access control validation.

The connection management agent (CMA) can be enhanced to perform additional node-level access control similar to the IPoIB driver for ARPs. For example the CMA can be enhanced such that it does not push events up to the application level in the database node unless the GRH.SGID associated with the MAD matches a VM authorized to access the database node. Adding node-bounded ACL capability to the CMA is particularly useful for handling DoS attacks by pushing attack prevention as close to the node boundaries as possible and avoiding the overhead of providing MADs to the application level for rejection.

However, in some embodiments, the Connection Management Agent (CMA) 622 does not validate access control of the specific VM to the specific database service, relying on a database process in the Application layer 610 to perform this check (such as e.g. DB Instance 506 and/or DB listener 546 of FIG. 5B). The CMA uses an event notification mechanism to indicate application transitions in the connection establishment state machine to the application layer. The database process in the application layer 610 can obtain (by subscribing to relevant events) information about the remote peer via the cma_id allocated for that connection, including the SGID/VMID of the VM requesting a connection. For example, the Upper Layer protocol (DB Instance 506, DB listener 546, IPoIB or other Application) can use the SGID/VMID provided in the remote address structure of the connection establishment event to validate access control based on the fine grain application layer ACL 524 and thereby accept or deny the connection based on ACL 524.

The application layer consumes events from the OFED stack. The application layer uses the OFED event notification mechanism to establish IB Connections. The Application Layer obtains the VMID of the VM for the specific connection during connection establishment flow as described above. The database process 610 in the application layer then uses the obtained VMID to enforce access control for the individual connection. The application layer determines when and how the VM identity (VMID obtained from the GRH.SGID) provided by the CMA layer in the cma_id is used to control access to the specific database service.

The application layer requires the database service name in addition to the VMID in order to identify which database service a particular compute node VM is trying to gain access to. If this information is not available at connection establishment time, the application can store the VM identity (VMID obtained from the GRH.SGID) make an initial connection and then use the VM identity to validate access permission as soon as the database service name becomes available (dropping the connection if permission is denied). The interface between the OFED stack and the application layer allows the application layer to identify the specific end-point of a connection, and terminate connectivity with the specific end-point based on the access control determination after receiving the database service name. Thus, the application may decide to initially accept the connection, and terminate it at a later stage. This allows the application layer to not rely on the database service name being available prior to connection establishment, and have it obtained as a part of an initial data exchange.

As shown in FIG. 6, if the database process 610 in the application layer accepts the connection, the acceptance is communicated to the InfiniBand Connection Management/ Connection Management Agent (IBCM/CMA) Drivers 622. The IBCM/CMA Drivers 622 are responsible for creating a hardware queue pair (QP) context 624 associated with the connection. The hardware QP context is kept in the system memory with a relatively small number of hardware QP contexts cached in HW QP context cache 634 of the HCA memory. For a connection to a compute node VM, the Hardware QP Context 624 includes an attributes that contains a flag indicating that the GRH must be used on the particular connection, and the VMID/SGID value of the particular VM associated with the connection.

Where the VM is not authorized to connect to the database service requested in the CAM MAD, the application prevents creation of a connection context and/or destroys an interim connection context. Thus, using the ACL, Connection Establishment Access Control implemented in the database node can deny connections to unauthorized VMs thereby preventing connections and thus communication between VMs and database services they are not authorized to access per the ACL.

Data Exchange Access Control

A further mechanism implemented in the database nodes for providing access control at a stage in the lifecycle of a connection between a virtual machine and a database service is data exchange access control. Data exchange access control, is based on the hardware queue pair (QP) context 624 programmed during the connection establishment phase. As described above, as shown in FIG. 6, the hardware QP context is kept in the system memory with a relatively small number of hardware QP contexts cached in HW QP Context Cache 634 of the HCA memory. For a connection to a compute node VM, the Hardware QP Context 624 includes attributes that contain a flag indicating that the GRH must be used on the particular connection, and the SGID value of the particular VM associated with the connection. Data exchange access control verifies that every packet received over the connection contains the specified GRH.SGID and thus comes from the VM authorized to use the connection. Non-compliant packets are discarded. This allows the HCA hardware to perform data exchange access control on all data packets transmitted over the connection.

An HCA that is compliant with the InfiniBand specification must validate that every single packet exchanged on that connection carries the GRH header, and that the GRH.SGID of the incoming packets match the remote peer GID specified in the hardware QP Context. In addition, all sequence number checks and protocol checks would be performed by hardware as well (similar to the TCP flags and sequence number validation for the TCP socket). Enforcement of these requirements ensures on-the-fly access control validation by the HCA hardware of the data transfers between VM and database service on a particular connection without any constraints on the InfiniBand operations performed (including RDMA operations), and without any performance impact.

As shown in FIG. 6, the HCA 366 inspects each InfiniBand Packet 402 and ensures, among other things, that the SGID in GRH 404 matches the SGID associated with the hardware QP context associated with the connection. All non-compliant packets are dropped. However, compliant packets, once validated, are stripped of the headers and the data/payload 406 is placed directly in an application buffer associated with the connection. Thus, even after a connection has been established, the hardware of the HCA on the database node performs data exchange access control on every packet to ensure that it comes from the VM authorized to access the particular database service via the particular connection.

IPoIB Access Control

Another mechanism implemented in the database nodes for providing access control at a stage in the lifecycle of a connection between a virtual machine and a database service is IPoIB Access Control. Limited access is enabled for TCP-socket traffic for the specific TCP port used by the database listener 546. However, the OS Stack IP Filter in the database node is configured to exclude unauthorized traffic. IPoIB can be configured for either connected or datagram modes. Each side of an IPoIB communication channel is configured independently, (i.e. one side can be configured to connected mode and another to datagram mode). In embodiments of the present invention, all communication over IPoIB is restricted to connected mode only. This is achieved by configuring the IPoIB driver of the database node to enforce use of connected mode by the remote peer such as a VM on a compute node.

IPoIB performs the following checks upon receiving a packet to guarantee that communication is using connected mode only. Communication over datagram QP should be restricted to ARP packets only—all other packets are discarded. IPoIB only establishes connections with the VMs listed in the database node ACL table. The Connection Management Agent (CMA) provides the IPoIB with address information about the remote peer establishing this connection. Among other address attributes, the CMA will provide an SGID of the peer (VM) as described in Connection Establishment Access Control section. The IPoIB driver should perform the following checks when processing connection establishment events. Obtain the remote end-point address information from the CMA event. Retrieve the VM's SGID from the address information provided in the CMA event. Match the VM's SGID with an ACL list entry and discard the connection establishment event if the VM's SGID does not match with an ACL list entry. This provides enhanced security allowing positive identification of the VM communicating with the database listener 546 in cooperation with the database listener 546 validating that the VM attempting to create a database process connection is allowed access to the specific database service.

Denial of Service (DoS) Attack Prevention

Protection against DoS attacks is one of the standard features provided by a conventional Ethernet firewall appliance. In a DoS attack multiple messages are sent to an interface. Even if the messages are rejected the sheer number of the messages and the overhead associated with rejecting the messages overwhelms the resources of the interface so that it cannot be used for legitimate traffic. A DoS attack does not necessarily represent a malicious actor and may be caused e.g. by misconfigured software or an error in hardware or software that causes the repeated messages. The systems and methods of the present invention provide multi-tenant aware, fine-grained database aware access control as described above. Because the access control is performed by the software and hardware of the database nodes, however, the system cannot use standard filtering techniques to address the DoS problem. By the time the attack can be detected by the database node, it is already under attack and has to spend at least some resources rejecting the messages. As described above, the amount or resource expended can be reduced by pushing message control/rejection close to the edge of the node. However it would also be desirable to provide other DoS attack prevention functionality.

Instead of attempting to follow a traditional firewall-based filtering approach, an embodiment of the present invention can take full advantage of being a fully engineered and highly integrated solution to address DoS issues. When components responsible for access control detect repeated attempts by a VM to connect to a database service which it is not authorized to access the components of the integrated system can take actions to remediate and log the access violation. For example, when the database listener 546 detects a repeated access violation it performs the following actions. The database listener 546 logs the access violation. The database listener 546 updates access control filters of other components located lower in the processing stack (e.g. IB Connection Management stack, or IPoIB driver), so consecutive attacks can be stopped on the lower level, closer to the database node boundaries and thus cause less interference with operation of the database node. The database listener 546 also notifies the management stack 210 and provides information about the attack including the GRH.S-GID including the VMID identifying the VM which is the source of the attack.

The system provides reliable identification of the virtual machine using the VMID which is embedded into the GRH.SDID of each packet by the HCA of the compute nodes. Thus, the identity of the attacker VM is known to the management stack 210 from the GRH-SGID associated with the attack packets. The management stack can take one or more of actions to stop the attack. For example the management stack can revoke the offending VMs access to the database access partition 204, thus preventing the VM from sending any further packets to the database nodes, Additionally, for example, the management stack can take actions to terminate operation of the VM depending upon the configuration of the management stack, or action taken by the system administrator. In this way the DoS packets can either be prevented from reaching the database nodes or the source of the DoS packets can be deactivated thereby achieving DoS protection functionality without a standard packet filtering firewall appliance.

While various embodiments of the present invention have been described above, it should be understood that they have been presented by way of example, and not limitation. It will be apparent to persons skilled in the relevant art that various changes in form and detail can be made therein without departing from the spirit and scope of the invention.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers.

Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments. The storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing network security in a multi-tenant environment, the method comprising:
    configuring a connection-based switched fabric of the multi-tenant environment to have a database access partition accessible to a plurality of database service consumers and accessible to a plurality of database servers which provide a plurality of database services wherein each of the plurality of database services utilizes data associated with a plurality of different tenants, the data being held in a plurality of storage cells;
    configuring the connection-based switched fabric of the multi-tenant environment to have a storage access partition accessible to a plurality of said plurality of database servers and accessible to a plurality of storage cells, but not accessible to said plurality of database service consumers, wherein each of the plurality of database services utilizes the data associated with the plurality of different tenants held in the plurality of storage cells;
    securely configuring a network interface controller of each of the plurality of application servers to associate each of the plurality of database service consumers hosted on said application server in association with the plurality of different tenants with a unique database service consumer identity, such that each of the plurality of database service consumers cannot modify or spoof the unique database service identity associated with said each of the plurality of database service consumers;
    configuring the network interface controller of each of the plurality of application servers to include the database service consumer identity associated with each of the plurality of database service consumers hosted on said application server in each communication packet transmitted from said database service consumer towards said plurality of database services;
    providing an access control list to each of the plurality of database servers, wherein the access control list identifies said plurality of database services and identifies for each of said plurality of database services one or more database service consumer identities associated with one or more database service consumers allowed to access said each of said plurality of database services;
    discarding with a network interface of each of the plurality of database servers all communication packets received from said plurality of application servers which do not include a database service consumer identity; and
    using said access control list in combination with a database service consumer identity included in a communication packet received at a network interface of a database server of the plurality of database servers to prevent access of the database consumer associated with the database consumer identity to a database service of said plurality of database services unless said access control list identifies said database service consumer as allowed to access said database service.

2. The method of claim 1, wherein said communication packet is an address resolution protocol (ARP) request, and wherein using said access control list in combination with a database consumer identity included in a communication packet received at a network interface of a database server of the plurality of database servers to prevent access of the database consumer associated with the database consumer identity to a database service of said plurality of database services unless said access control list identifies said database service consumer as allowed to access said database service comprises:
    determining whether the access control list identifies said database service consumer as authorized to access any one of said plurality of databases services which is provided by said database server; and
    dropping the ARP request without transmitting an ARP response if the access control list does not identify said database service consumer as authorized to access any one of said plurality of databases services which is provided by said database server.

3. The method of claim 1, wherein said communication packet is a connection establishment request, and wherein using said access control list in combination with a database consumer identity included in a communication packet received at a network interface of a database server of the plurality of database servers to prevent access of the database consumer associated with the database consumer identity to a database service of said plurality of database services unless said access control list identifies said database service consumer as allowed to access said database service comprises:
    determining in the database server whether the access control list identifies said database service consumer as authorized to access any one of said plurality of databases services which is provided by said database server; and
    dropping the connection establishment request without establishing a connection if the access control list does not identify said database service consumer as authorized to access any one of said plurality of databases services which is provided by said database server.

4. The method of claim 1, wherein said communication packet is a connection establishment request, and wherein using said access control list in combination with a database consumer identity included in a communication packet received at a network interface of a database server of the plurality of database servers to prevent access of the database consumer associated with the database consumer identity to a database service of said plurality of database services unless said access control list identifies said database service consumer as allowed to access said database service comprises:
- determining in the database server to which database service the connection establishment request is requesting to make a connection; and
- preventing establishment of a connection to the database service in response to said connection establishment request if the access control list does not identify said database service consumer as authorized to access said database service.

5. The method of claim 1, wherein said communication packet is a connection establishment request, and wherein using said access control list in combination with a database consumer identity included in a communication packet received at a network interface of a database server of the plurality of database servers to prevent access of the database consumer associated with the database consumer identity to a database service of said plurality of database services unless said access control list identifies said database service consumer as allowed to access said database service comprises:
- creating a connection in response to said connection establishment request;
- receiving over said connection an identification of a database service intended to be accessed by the database service consumer over said connection; and
- terminating said connection if the access control list does not identify said database service consumer as authorized to access said database service.

6. The method of claim 1, wherein said communication packet is a data packet received over a connection established between the database service consumer a database service, and wherein using said access control list in combination with a database consumer identity included in a communication packet received at a network interface of a database server of the plurality of database servers to prevent access of the database consumer associated with the database consumer identity to a database service of said plurality of database services unless said access control list identifies said database service consumer as allowed to access said database service comprises:
- associating a hardware context with said connection established between the database service consumer and the database service, wherein the hardware context includes the database service consumer identifier of the database service consumer;
- dropping said data packet unless it includes the database service consumer identity included in the hardware context associated with the connection.

7. The method of claim 6, wherein said network interface is a host channel adapter, and wherein said data packet is received at the host channel adapter of the database server and the hardware context is stored in a memory of said host channel adapter, and wherein dropping said data packet unless it includes the database service consumer identity included in the hardware context associated with the connection comprises:
- dropping said data packet using the host channel adapter unless it includes the database service consumer identity included in the hardware context associated with the connection and stored in the memory of said host channel adapter.

8. The method of claim 1, wherein using said access control list in combination with a database consumer identity included in a communication packet received at a network interface of a database server of the plurality of database servers to prevent access of the database consumer associated with the database consumer identity to a database service of said plurality of database services unless said access control list identifies said database service consumer as allowed to access said database service comprises:
- performing one of address resolution access control, connection establishment access control, and data exchange access control based on said access control list.

9. The method of claim 1, further comprising:
- providing each of the plurality of database servers with another network interface for communicating with said plurality of storage cells using the storage access partition, wherein the another network interface is configured such that it does not perform address resolution access control, connection establishment access control, and data exchange access control based on said access control list.

10. The method of claim 1, further comprising:
- using the network interface of each of the plurality of database servers to log unauthorized access attempts to said plurality of database services and a database service consumer identity included in communication packets associated with said unauthorized access attempts;
- providing said log of unauthorized access attempts to said plurality of database services and database service consumer identity included in communication packets associated with said unauthorized access attempts to a management stack;
- using the management stack to block access of a database consumer identified by said database service consumer identity included in communication packets associated with said unauthorized access attempts to said database access partition thereby preventing communication with said plurality of database servers and blocking said unauthorized access attempts.

11. A system for providing network security in a multi-tenant environment comprising:
- a plurality of storage cells holding data associated with a plurality of different tenants;
- a plurality of database servers providing a plurality of database services which utilize said data associated with the plurality of different tenants;
- a plurality of application servers hosting a plurality of database service consumers associated with the plurality of different tenants;
- a connection-based switched fabric configured to have a database access partition accessible to the plurality of database service consumers and the plurality of database services, and a storage access partition accessible to said plurality of database services said plurality of storage cells but not accessible to said plurality of database service consumers;
- an application server network interface controller in each of the plurality of application servers, wherein the application server network interface controller is securely configured to associate each of the plurality of database service consumers hosted on said application server with a unique database service consumer identity, such that each of the plurality of database service consumers cannot modify or spoof the unique database service identity associated with said each of the plurality of database service consumers, and wherein the application server network interface controller is also configured to include the database service consumer identity in each communication packet transmitted from said each database service consumer towards said plurality of database services;
an access control list stored on each of the plurality of database servers, wherein the access control list identifies said plurality of database services and identifies for each of said plurality of database services one or more database service consumer identities associated with one or more database service consumers allowed to access said each of said plurality of database services;
a database server network interface in each of the plurality of database servers, wherein each database server network interface is securely configured to discard all communication packets received from said plurality of database service consumers which do not include a database service consumer identity; and
wherein each database server network interface which receives a communication packet is configured to use said access control list in combination with a database service consumer identity included in the communication packet to prevent access of the database consumer associated with the database consumer identity to a database service of said plurality of database services unless said access control list identifies said database service consumer as allowed to access said database service.

12. The system of claim 11, wherein said communication packet is an address resolution protocol (ARP) request, and wherein the database server network interface which receives the ARP request is configured to:
determine whether the access control list identifies said database service consumer as authorized to access any one of said plurality of databases services which is provided by said database server; and
drop the ARP request without transmitting an ARP response if the access control list does not identify said database service consumer as authorized to access any one of said plurality of databases services which is provided by said database server.

13. The system of claim 11, wherein said communication packet is a connection establishment request, and wherein the database server network interface which receives the connection establishment request is configured to:
determine whether the access control list identifies said database service consumer as authorized to access any one of said plurality of databases services which is provided by said database server; and
drop the connection establishment request without establishing a connection if the access control list does not identify said database service consumer as authorized to access any one of said plurality of databases services which is provided by said database server.

14. The system of claim 11, wherein said communication packet is a connection establishment request, and wherein the database server network interface which receives the connection establishment request is configured to:
determine to which database service the connection establishment request is requesting to make a connection; and
prevent establishment of a connection to the database service in response to said connection establishment request if the access control list does not identify said database service consumer as authorized to access said database service.

15. The system of claim 11, wherein said communication packet is a connection establishment request, and wherein the database server network interface which receives the connection establishment request is configured to:
create a connection in response to said connection establishment request;
receive over said connection an identification of a database service intended to be accessed by the database service consumer over said connection; and
terminate said connection if the access control list does not identify said database service consumer as authorized to access said database service.

16. The system of claim 11, wherein said communication packet is a data packet received over a connection established between the database service consumer and a database service, and wherein the database server network interface which receives the data packet over the connection is a host channel adapter configured to:
associate a hardware context with said connection established between the database service consumer and the database service, wherein the hardware context is stored in a memory of said host channel adapter and includes the database service consumer identifier of the database service consumer; and
drop said data packet unless it includes the database service consumer identity included in the hardware context associated with the connection and stored in the memory of said host channel adapter.

17. The system of claim 11, wherein the database server network interface in each of the plurality of database servers, is configured to use the access control list stored on each of the plurality of database servers to perform one of address resolution access control, connection establishment access control, and data exchange access control based on said access control list.

18. The system of claim 11, wherein each of the plurality of database servers comprises another network interface for communicating with said plurality of storage cells using the storage access partition, wherein the another network interface is configured such that it does not perform address resolution access control, connection establishment access control, and data exchange access control based on said access control list.

19. The system of claim 11, further comprising:
a management stack in communication with said plurality of database servers;
wherein the database server network interface in each of the plurality of database servers is configured to log unauthorized access attempts to said plurality of database services and a database service consumer identity included in communication packets associated with said unauthorized access attempts and provide said log to the management stack;
wherein the management stack is configured to block access of a database consumer identified by said database service consumer identity included in communication packets associated with said unauthorized access attempts to said database access partition thereby preventing communication with said plurality of database servers and blocking said unauthorized access attempts.

20. A non-transitory computer readable medium including instructions stored thereon for providing network security in a multi-tenant environment, which instructions, when executed, causes components of said multi-tenant environment to perform steps comprising:

configuring a connection-based switched fabric of the multi-tenant environment to have a database access partition accessible to a plurality of database service consumers and accessible to a plurality of database servers which provide a plurality of database services wherein each of the plurality of database services utilizes data associated with a plurality of different tenants, the data being held in a plurality of storage cells;

configuring the connection-based switched fabric of the multi-tenant environment to have a storage access partition accessible to a plurality of said plurality of database servers and accessible to a plurality of storage cells, but not accessible to said plurality of database service consumers, wherein each of the plurality of database services utilizes the data associated with the plurality of different tenants held in the plurality of storage cells;

securely configuring a network interface controller of each of the plurality of application servers to associate each of the plurality of database service consumers hosted on said application server in association with the plurality of different tenants with a unique database service consumer identity, such that each of the plurality of database service consumers cannot modify or spoof the unique database service identity associated with said each of the plurality of database service consumers;

configuring the network interface controller of each of the plurality of application servers to include the database service consumer identity associated with each of the plurality of database service consumers hosted on said application server node in each communication packets transmitted from said database service consumer towards said plurality of database services;

providing an access control list to each of the plurality of database servers, wherein the access control list identifies said plurality of database services and identifies for each of said plurality of database services one or more database service consumer identities associated with one or more database service consumers allowed to access said each of said plurality of database services;

discarding with a network interface of each of the plurality of database servers all communication packets received from said plurality of application servers which do not include a database service consumer identity; and using said access control list in combination with a database service consumer identity included in a communication packet received at a network interface of a database server node of the plurality of database servers to prevent access of the database consumer associated with the database consumer identity to a database service of said plurality of database services unless said access control list identifies said database service consumer as allowed to access said database service.

* * * * *

UNITED STATES PATENT AND TRADEMARK OFFICE
CERTIFICATE OF CORRECTION

PATENT NO.       : 9,723,009 B2
APPLICATION NO.  : 14/848111
DATED            : August 1, 2017
INVENTOR(S)      : Makhervaks et al.

It is certified that error appears in the above-identified patent and that said Letters Patent is hereby corrected as shown below:

On the Title Page

On page 3, Column 1, under Other Publications, Line 2, delete "Applciation" and insert -- Application --, therefor.

On page 3, Column 1, under Other Publications, Line 5, delete "Applciation" and insert -- Application --, therefor.

In the Specification

In Column 1, above "COPYRIGHT NOTICE", insert -- CROSS REFERENCE TO RELATED APPLICATIONS This application is related to the following patent application, which is hereby incorporated by reference in its entirety: U.S. Patent Application titled "SYSTEM AND METHOD FOR PROVIDING AN INTEGRATED FIREWALL FOR SECURE NETWORK COMMUNICATION IN A MULTI-TENANT ENVIRONMENT", application Ser. No. 14/848,109, filed Sep. 8, 2015. --.

In Column 1, Lines 31-40, Above "BACKGROUND" delete "CROSS REFERENCE TO RELATED APPLICATIONS This application is related to the following patent application, which is hereby incorporated by reference in its entirety: U.S. Patent Application titled "SYSTEM AND METHOD FOR PROVIDING AN INTEGRATED FIREWALL FOR SECURE NETWORK COMMUNICATION IN A MULTI-TENANT ENVIRONMENT", application Ser. No. 14/848,109, filed Sep. 8, 2015.".

In Column 24, Line 31, delete "nodes," and insert -- nodes. --, therefor.

Signed and Sealed this
Twentieth Day of February, 2018

Andrei Iancu
*Director of the United States Patent and Trademark Office*